United States Patent
Wu

(10) Patent No.: US 12,510,461 B2
(45) Date of Patent: Dec. 30, 2025

(54) SYSTEMS FOR LIGHT DETECTION ARRAY MULTIPLEXING AND METHODS FOR SAME

(71) Applicant: Becton, Dickinson and Company, Franklin Lakes, NJ (US)

(72) Inventor: Austin Wu, San Jose, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 265 days.

(21) Appl. No.: 17/207,046

(22) Filed: Mar. 19, 2021

(65) Prior Publication Data
US 2021/0325292 A1   Oct. 21, 2021

Related U.S. Application Data

(60) Provisional application No. 63/010,890, filed on Apr. 16, 2020.

(51) Int. Cl.
*G01N 15/1434* (2024.01)

(52) U.S. Cl.
CPC .  *G01N 15/1434* (2013.01); *G01N 2015/1438* (2013.01)

(58) Field of Classification Search
None
See application file for complete search history.

(56) References Cited

U.S. PATENT DOCUMENTS

| | | | | |
|---|---|---|---|---|
| 2003/0058445 A1* | 3/2003 | Fritz | ............... | G01N 15/1456 356/399 |
| 2005/0042760 A1* | 2/2005 | Yount | ............... | G06F 18/23 436/63 |
| 2005/0275839 A1* | 12/2005 | Robinson | ............... | G01J 3/2803 356/73 |
| 2008/0213915 A1* | 9/2008 | Durack | ............... | G01N 15/1459 436/172 |

(Continued)

FOREIGN PATENT DOCUMENTS

WO   WO/2001/073417 A1   10/2001

OTHER PUBLICATIONS

Suyama, Motohiro, and Maridel Lares. "Photomultipliers: Hybrid detector combines PMT and semiconductor-diode technologies." Laser Focus World 44 (2008). (Year: 2008).*

*Primary Examiner* — Rufus L Phillips
(74) *Attorney, Agent, or Firm* — Khin K. Chin; Bret E. Field; BOZICEVIC, FIELD & FRANCIS LLP

(57) ABSTRACT

Aspects of the present disclosure include systems for irradiating particles in a flow stream. Systems according to certain embodiments include a light source having a first laser configured to irradiate a flow stream at a first position and a second laser configured to irradiate the flow stream at a second position and a light detection system having a single light collection component configured to collect light from the flow stream and a single photodetector array having a plurality of photodetectors configured to detect light from the lasers conveyed through the single light collection (Continued)

component. Methods for determining one or more parameters of a particle in a flow stream with the subject systems are also described. Non-transitory computer readable storage medium with instructions for practicing methods with the subject systems are also provided.

9 Claims, 8 Drawing Sheets

(56) References Cited

U.S. PATENT DOCUMENTS

| | | | |
|---|---|---|---|
| 2012/0044480 A1* | 2/2012 | Javadi | G01N 15/1434 |
| | | | 356/73 |
| 2013/0200277 A1* | 8/2013 | Li | G01N 21/645 |
| | | | 250/206 |
| 2017/0131206 A1 | 5/2017 | Li et al. | |
| 2018/0275097 A1* | 9/2018 | Sandoghdar | G01N 30/6095 |
| 2019/0025212 A1 | 1/2019 | Evans | |
| 2019/0094123 A1* | 3/2019 | Cao | G01N 15/1434 |
| 2019/0383725 A1 | 12/2019 | Petersen et al. | |
| 2019/0390988 A1 | 12/2019 | Rovner | |
| 2021/0033512 A1* | 2/2021 | Linneen | G01N 11/12 |
| 2021/0247293 A1* | 8/2021 | Ilkov | G01N 15/1434 |
| 2021/0255089 A1* | 8/2021 | Norton | G01N 15/1459 |
| 2022/0146401 A1* | 5/2022 | Yamamoto | G01N 15/1429 |

\* cited by examiner

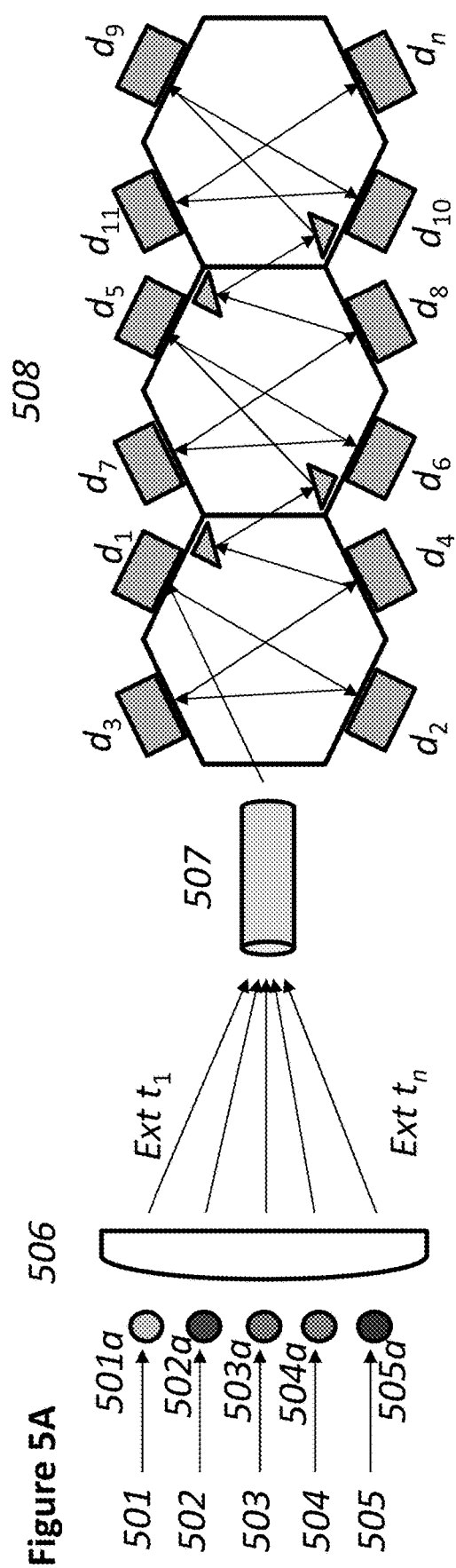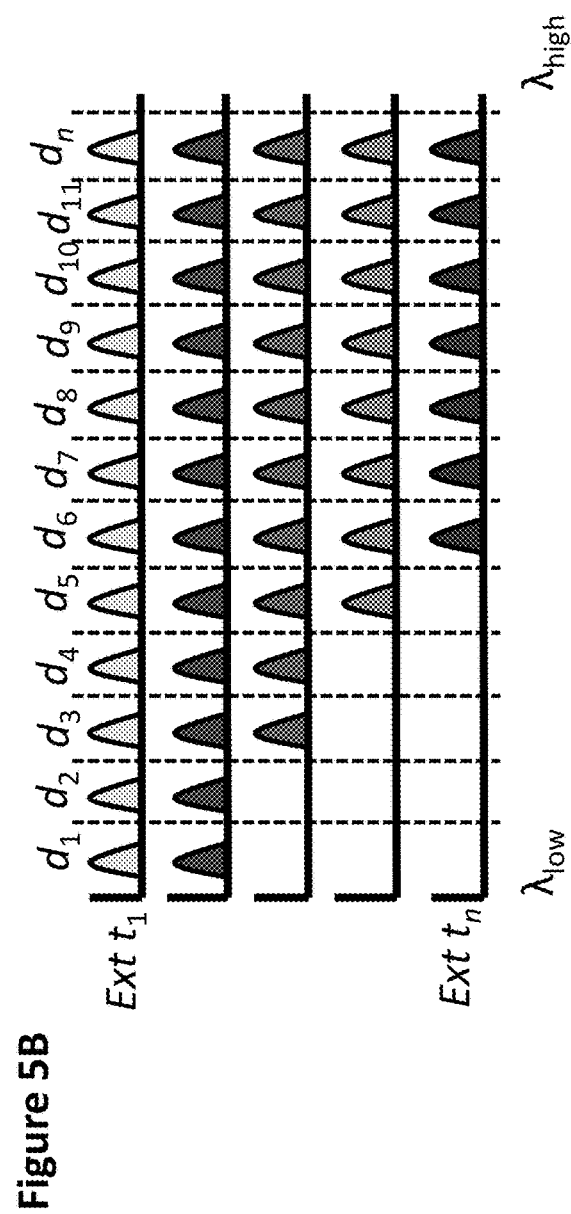
Figure 5A
Figure 5B

Figure 6

SYSTEMS FOR LIGHT DETECTION ARRAY MULTIPLEXING AND METHODS FOR SAME

CROSS-REFERENCE

Pursuant to 35 U.S.C. § 119 (e), this application claims priority to the filing date of U.S. Provisional Patent Application Ser. No. 63/010,890 filed Apr. 16, 2020, the disclosure of which application is incorporated herein by reference in its entirety.

INTRODUCTION

The characterization of analytes in biological fluids has become an integral part of medical diagnoses and assessments of overall health and wellness of a patient. Detecting analytes in biological fluids, such as human blood or blood derived products, can provide results that may play a role in determining a treatment protocol of a patient having a variety of disease conditions.

Flow cytometry is a technique used to characterize and often times sort biological material, such as cells of a blood sample or particles of interest in another type of biological or chemical sample. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. To characterize the components of the flow stream, the flow stream is irradiated with light. Variations in the materials in the flow stream, such as morphologies or the presence of fluorescent labels, may cause variations in the observed light and these variations allow for characterization and separation.

To characterize the components in the flow stream, light must impinge on the flow stream and be collected. Light sources in flow cytometers can vary from broad spectrum lamps, light emitting diodes as well as single wavelength lasers. The light source is aligned with the flow stream and an optical response from the illuminated particles is collected and quantified.

SUMMARY

Aspects of the present disclosure include systems for irradiating particles in a flow stream. Systems according to certain embodiments include a light source having a first laser configured to irradiate a flow stream at a first position and a second laser configured to irradiate the flow stream at a second position and a light detection system having a single light collection component configured to collect light from the flow stream and a single photodetector array having a plurality of photodetectors configured to detect light from the lasers conveyed through the single light collection component. Methods for determining one or more parameters of a particle in a flow stream with the subject systems are also described. Non-transitory computer readable storage media with instructions for practicing methods with the subject systems are also provided.

In embodiments, systems include a light source having a laser configured to irradiate a flow stream at a first position and one or more lasers configured to irradiate the flow stream at positions different from the first position, such as at positions downstream from the first position. In some embodiments, the light source includes 2 or more lasers configured to irradiate the flow stream at downstream positions, such as 3 or more lasers, such as 4 or more lasers, such as 5 or more lasers, such as 6 or more lasers, such as 12 or more lasers, such as 16 or more lasers, such as 32 or more lasers and including 64 or more lasers. In certain embodiments, the light source includes a first laser configured to irradiate the flow stream at a first position, a second laser configured to irradiate the flow stream at a position downstream from the first laser, a third laser configured to irradiate the flow stream at a position downstream from the second laser, a fourth laser configured to irradiate the flow stream at a position downstream from the third laser and a fifth laser configured to irradiate the flow stream at a position downstream from the fourth laser. In certain instances, each of the lasers are configured to independently irradiate positions on the flow stream that are spaced apart from each other, such as 10 µm or less, such as 9 µm or less, such as 8 µm or less, such as 7 µm or less, such as 6 µm or less and including positions on the flow stream that are spaced apart by 5 µm or less. In embodiments, each of the lasers is configured to independently irradiate the flow stream for a discrete interval, such as an interval that ranges from 0.001 µs to 500 ms, such as from 1 µs to 5000 µs.

Systems include a light detection system for detecting light from particles in the irradiated flow stream. Light detection systems according to certain embodiments include a single light collection component configured to collect light from the flow stream and a single photodetector array having a plurality of photodetectors to detect light that is conveyed through the single light collection component. In some instances, the light collection component includes a single fiber optic.

In embodiments, the photodetector array includes a plurality of photodetectors that are configured to detect light conveyed from the light collection component. In some embodiments, light from the light collection component is propagated within the photodetector array to each of the photodetectors. In certain embodiments, the photodetectors in the array are arranged in a geometric configuration such that light is sequentially propagated between each of the photodetectors, such as with mirrors (e.g., dichroic mirrors), beam splitters or lenses. In some instances, the photodetector array is arranged such that light is sequentially detected by the photodetectors at different times as the light is propagated within the photodetector array.

In some instances, the photodetector array includes one or more optical adjustment components that are configured to restrict one or more wavelengths of light from being detected by each photodetector. In certain instances, the optical adjustment component is a bandpass filter. In other instances, the optical adjustment component is a dichroic mirror, such as a dichroic mirror which conveys a spectral range of light having a predetermined set of wavelengths. In some embodiments, each photodetector in the photodetector array is configured to differentially detect light conveyed by the light collection component. In some instances, each photodetector is configured to detect one or more predetermined sets of wavelengths of light, such as where each photodetector is configured to detect a set of 50 different wavelengths or less, such as a set of 25 different wavelengths or less. In certain embodiments, one or more photodetectors in the photodetector array are configured to detect light from one or more designated lasers of the light source.

In some embodiments, systems include a processor having memory operably coupled to the processor wherein the memory includes instructions stored thereon, which when executed by the processor, cause the processor to assign each photodetector in the photodetector array to detect a predetermined set of wavelengths of light. In some embodiments, the memory includes instructions for receiving multiplexed data signals generated by the photodetector array. In some instances, the multiplexed data signals are time-division multiplexed data signals. In other instances, the multiplexed data signals are wavelength-division multiplexed data signals. In yet other instances, the data signals are time-division and wavelength-division multiplexed data signals. In some embodiments, memory includes instructions for spectrally resolving light detected by the photodetectors of the photodetector array. In some instances, the memory includes instructions for spectrally resolving light by calculating a spectral unmixing matrix for each spectra of light detected by the photodetectors of the photodetector array.

Aspects of the present disclosure also include methods for determining one or more parameters of a particle in a flow stream. Methods according to certain embodiments include irradiating a particle in a flow stream with a first laser, irradiating the particle in the flow stream with a second laser, detecting light from the particle with a single photodetector array having a plurality of photodetectors that is conveyed to the photodetector array through a single light collection component, generating multiplexed data signals from the photodetector array and determining one or more parameters of the particle based on the multiplexed data signals. In some embodiments, the parameters are determined from wavelength-division multiplexed data signals. In other embodiments, the parameters are determined from time-division multiplexed data signals. In certain embodiments, the determined parameters are used to identify the particle. In some instances, the determined parameters are used to sort the particle.

In some embodiments, methods include irradiating a flow stream at a first position with a first laser and irradiating the flow stream with one or more lasers at positions different from the first position, such as at positions downstream from the first position. In some instances, methods include irradiating the flow stream with 2 or more lasers, such as 3 or more lasers, such as 4 or more lasers, such as 5 or more lasers, such as 6 or more lasers, such as 12 or more lasers, such as 16 or more lasers, such as 32 or more lasers and including irradiating the flow stream with 64 or more lasers. In embodiments, the flow stream is irradiated at positions that are independently spaced apart from each other, such as by 10 µm or less, such as 9 µm or less, such as 8 µm or less, such as 7 µm or less, such as 6 µm or less and including positions on the flow stream that are spaced apart by 5 µm or less. In some embodiments, the flow stream is independently irradiated with each laser for a discrete interval that ranges, such as, from 0.001 µs to 500 ms, such as from 1 µs to 5000 µs.

In embodiments, light from the lasers is conveyed through a single light collection component to a single photodetector array. In some instances, light is conveyed to the single photodetector array with a single fiber optic. Light from the single light collection component is detected by a plurality of photodetectors.

In some embodiments, methods include detecting one or more predetermined sets of wavelengths of light with each photodetector in the photodetector array, such as where each set of wavelengths includes 50 different wavelengths or less, such as 25 different wavelengths or less. In some instances, light conveyed to the photodetector array is detected by each of the photodetectors at different times, such as where light is propagated sequentially between each of the photodetectors in the photodetector array. In certain instances, methods further include assigning each photodetector in the photodetector array to detect a predetermined set of wavelengths of light. In some embodiments, light is spectrally resolved by the photodetectors or the photodetector array. In certain instances, spectrally resolving the detected light includes calculating a spectral unmixing matrix for each detected spectrum of light.

Aspects of the present disclosure also include a non-transitory computer readable storage medium for determining one or more parameters of a particle in a flow stream. Non-transitory computer readable storage medium according to certain embodiments include algorithm for irradiating a particle in a flow stream with a first laser, algorithm for irradiating the particle in the flow stream with a second laser, algorithm for detecting light from the particle with a single photodetector array having a plurality of photodetectors, algorithm for generating multiplexed data signals from the photodetector array and algorithm for determining one or more parameters of the particle based on the multiplexed data signals. In some embodiments, the non-transitory computer readable storage medium includes algorithm for generating time-division multiplexed data signals. In other embodiments, the non-transitory computer readable storage medium includes algorithm for generating wavelength-division multiplexed data signals.

In some embodiments, the subject non-transitory computer readable storage medium include algorithm for irradiating a flow stream at a first position with a first laser and irradiating the flow stream with one or more lasers at positions different from the first position, such as at positions downstream from the first position. In some instances, the non-transitory computer readable storage medium includes algorithm for irradiating the flow stream with a plurality of lasers at positions that are spaced apart from each other by 10 µm or less. In certain instances, the non-transitory computer readable storage medium includes algorithm for irradiating the flow stream with a first laser at a first position of the flow stream, algorithm for irradiating the flow stream with a second laser at a second position of the flow stream that is downstream from the first position, algorithm for irradiating the flow stream with a third laser at a third position of the flow stream that is downstream from the second position, algorithm for irradiating the flow stream with a fourth laser at a fourth position of the flow stream that is downstream from the third position and algorithm for irradiating the flow stream with a fifth laser at a firth position of the flow stream that is downstream from the fourth position.

In some embodiments, the non-transitory computer readable storage medium includes algorithm for detecting one or more predetermined sets of wavelengths of light with each photodetector in the photodetector array, such as sets of wavelengths of light that include 50 different wavelengths or less, such as 25 different wavelengths or less. In some embodiments, the non-transitory computer readable storage medium includes algorithm for assigning each photodetector in the photodetector array to detect a predetermined set of wavelengths of light. In some instances, the non-transitory computer readable storage medium includes algorithm for detecting light with each photodetector in the photodetector array at different times. In certain instances, the non-transitory computer readable storage medium includes algorithm for spectrally resolving the light detected by the photodetectors of the photodetector array, such as with algorithm for calculating a spectral unmixing matrix for each detected spectra of light.

In embodiments, non-transitory computer readable storage medium of interest includes algorithm for determining one or more parameters of an irradiated particle in a flow stream from generated data signals from a photodetector array. In some embodiments, the non-transitory computer readable storage medium includes algorithm for identifying the particle based on the one or more determined parameters of the particle. In other embodiments, the non-transitory computer readable storage medium includes algorithm for sorting the particle based on the one or more determined parameters of the particle.

Kits including one or more components of the subject systems are also provided. Kits according to certain embodiments include one or more lasers. Kits may also include a photodetector array for detecting light from the flow stream. In certain embodiments, the subject kits may also include a light collection component for propagating light from the flow stream to the photodetector array, such a single fiber optic. Kits may also include one or more optical adjustment components that are configured to reduce the passage of predetermined wavelengths of light. In some instances, the optical adjustment component is a bandpass filter, such as a long pass filter. In other instances, the optical adjustment component is a dichroic mirror.

BRIEF DESCRIPTION OF THE FIGURES

The invention may be best understood from the following detailed description when read in conjunction with the accompanying drawings. Included in the drawings are the following figures:

FIG. 5A depicts a system for irradiating a particle in a flow stream according to certain embodiments. FIG. 5B depicts generated data signals from light detected by photodetectors of a photodetector array according to certain embodiments.

FIG. 6 depicts the multiplexing configuration of photodetectors in a photodetector array according to certain embodiments.

DETAILED DESCRIPTION

Figure 1:
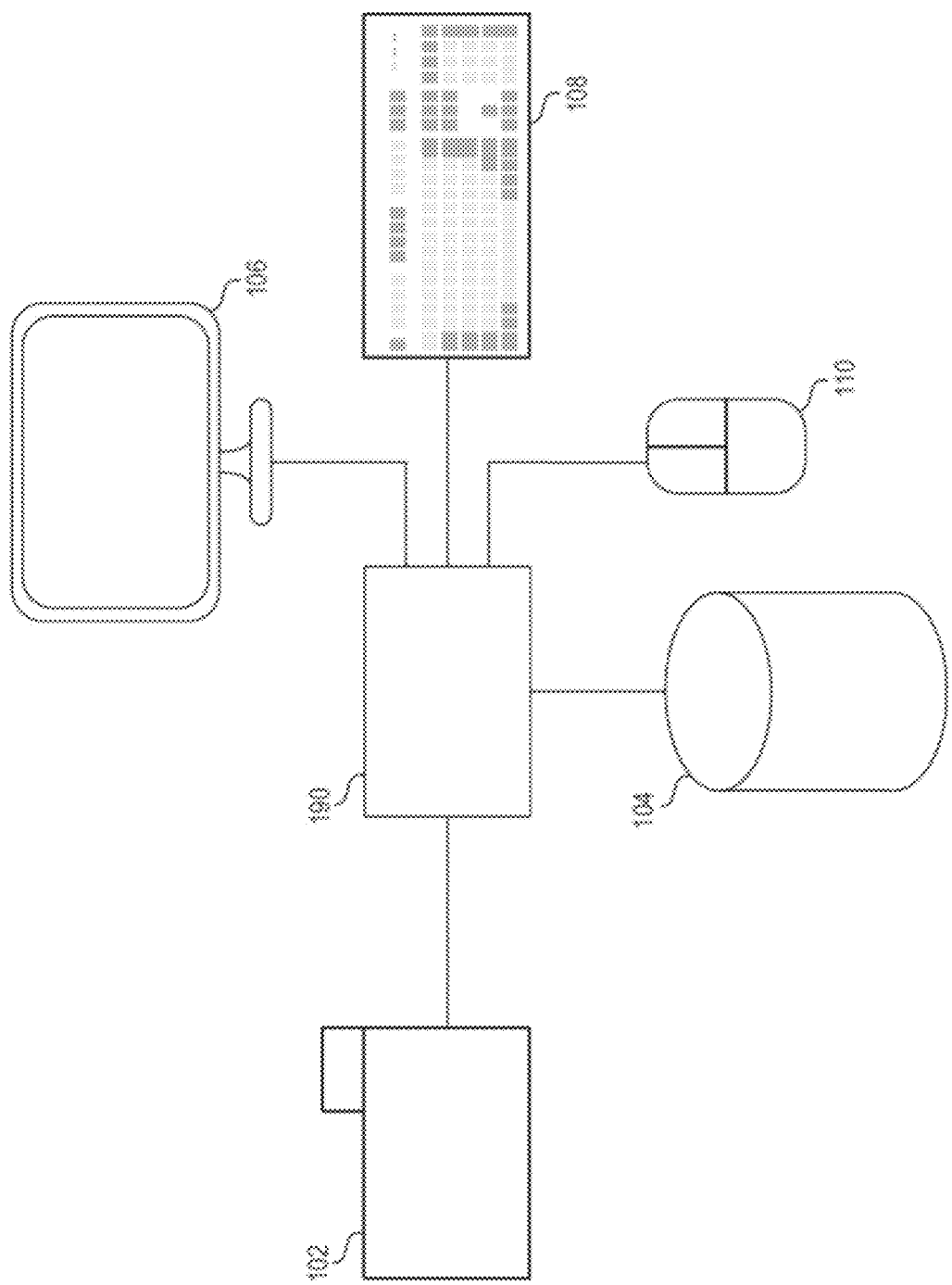
FIG. 1 depicts a functional block diagram for one example of a sorting control system according to certain embodiments.

Aspects of the present disclosure include systems for irradiating particles in a flow stream. Systems according to certain embodiments include a light source having a first laser configured to irradiate a flow stream at a first position and a second laser configured to irradiate the flow stream at a second position and a light detection system having a single light collection component configured to collect light from the flow stream and a single photodetector array having a plurality of photodetectors configured to detect light from the lasers conveyed through the single light collection component. Methods for determining one or more parameters of a particle in a flow stream with the subject systems are also described. Non-transitory computer readable storage medium with instructions for practicing methods with the subject systems are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides systems with multiple lasers having modified beam profiles. In further describing embodiments of the disclosure, systems having a light source that includes two or more lasers configured to irradiate different positions on a flow stream and a light source having a single light collection component and a single photodetector array are first described in greater detail. Next, methods for detecting light from a particle in the flow stream and determining one or more parameters of the particle from multiplexed data signals are described. Non-transitory computer readable storage medium with instructions for practicing the subject methods and kits having one or more components of the subject systems are also provided.

Systems for Irradiating Particles in a Flow Stream

Aspects of the present disclosure include systems for irradiating particles in a flow stream. Systems according to certain embodiments include a light source having a first laser configured to irradiate a flow stream at a first position and one or more lasers configured to irradiate the flow stream at positions different from the first position and a light detection system having a single light collection component configured to collect light from the flow stream and a single photodetector array having a plurality of photodetectors configured to detect light from the lasers conveyed through the single light collection component.

In embodiments, systems include a light source having a laser configured to irradiate a flow stream at a first position and one or more lasers configured to irradiate the flow stream at positions different from the first position, such as at positions downstream from the first position, as described in greater detail below. In some embodiments, the light source includes 2 or more lasers configured to irradiate the flow stream at downstream positions, such as 3 or more lasers, such as 4 or more lasers, such as 5 or more lasers, such as 6 or more lasers, such as 12 or more lasers, such as 16 or more lasers, such as 32 or more lasers and including 64 or more lasers. In embodiments, each laser of the subject light source may be configured to emit wavelengths of light that vary, ranging from 200 nm to 1500 nm, such as from 250 nm to 1250 nm, such as from 300 nm to 1000 nm, such as from 350 nm to 900 nm and including from 400 nm to 800 nm. For example, one or more lasers of the light source may be configured to emit light having a wavelength that ranges from 200 nm to 900 nm.

The types of lasers may vary, wherein lasers of interest may include a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject light sources include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject lights source includes a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

Each laser may be positioned any suitable distance from the flow stream (e.g., in a particle analyzer in a flow cytometer), such as at a distance of 0.001 mm or more from the flow stream, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the lasers may be configured to irradiate the flow stream at any suitable angle (e.g., relative the vertical axis of the flow stream), such as at an angle ranging from 10° to 90°, such as from 15° to 85°, such as from 20° to 80°, such as from 25° to 75° and including from 30° to 60°, for example at a 90° angle.

Each laser may be independently configured to irradiate the flow stream continuously or in discrete intervals. In some instances, one or more of the lasers of the light source are configured to irradiate the flow stream continuously, such as with a continuous wave laser that continuously irradiates the flow stream. In other instances, one or more of the lasers of the light source are configured to irradiate the flow stream at discrete intervals, such as every 0.001 milliseconds, every 0.01 milliseconds, every 0.1 milliseconds, every 1 millisecond, every 10 milliseconds, every 100 milliseconds and including every 1000 milliseconds, or some other interval. Where one or more of the lasers of the light source are configured to irradiate the sample at discrete intervals, systems may include one or more additional components to provide for intermittent irradiation of the flow stream with the light source. For example, the subject systems in these embodiments may include one or more laser beam choppers, manually or computer controlled beam stops for blocking and exposing the sample to the light source.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each laser may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each laser is 10 microseconds. In embodiments where sample is sequentially irradiated by more than two (i.e., 3 or more) lasers, the delay between irradiation by each light source may be the same or different.

In embodiments, the light source includes a laser configured to irradiate a flow stream at a first position and one or more lasers configured to irradiate the flow stream at positions different from the first position, such as at positions downstream from the first position. For instance, in one example, the light source includes a first laser configured to irradiate the flow stream at a first position, a second laser configured to irradiate the flow stream at a position downstream from the first laser, a third laser configured to irradiate the flow stream at a position downstream from the second laser, a fourth laser configured to irradiate the flow stream at a position downstream from the third laser and a fifth laser configured to irradiate the flow stream at a position downstream from the fourth laser. Depending on the flow rate of the flow stream and the distance between the position of irradiation by each laser, each of the lasers is configured to independently irradiate the flow stream at a position that is 5 μm or more downstream from the position of irradiation by the first laser, such as 6 μm or more, such as 7 μm or more, such as 8 μm or more, such as 9 μm or more, such as 10 μm or more, such as 15 μm or more, such as 25 μm or more, such as 50 μm or more, such as 100 μm or more, such as 250 μm or more, such as 500 μm or more and including where each laser is independently configured to irradiate the flow stream at a position that is 1000 μm or more downstream from the position of irradiation by the first laser. For instance, the position of irradiation of the flow stream by each laser may be downstream from the position of irradiation of the flow stream by the first laser by a distance of from 5 μm to 5000 μm, such as from 10 μm to 2500 μm, such as from 25 μm to 1000 μm, such as from 50 μm to 750 μm, such as from 75 μm to 500 μm and including from 100 μm to 250 μm. In some embodiments, each of the lasers are configured to independently irradiate positions on the flow stream that are spaced apart from each other by 10 μm or less, such as 9 μm or less, such as 8 μm or less, such as 7 μm or less, such as 6 μm or less and including positions on the flow stream that are spaced apart by 5 μm or less.

In certain embodiments, the light source is a light beam generator that is configured to generate two or more beams of frequency shifted light. In some instances, the light beam generator includes a laser, a radiofrequency generator configured to apply radiofrequency drive signals to an acousto-optic device to generate two or more angularly deflected laser beams. In these embodiments, the laser may be a pulsed lasers or continuous wave laser. For example lasers in light beam generators of interest may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

The acousto-optic device may be any convenient acousto-optic protocol configured to frequency shift laser light using applied acoustic waves. In certain embodiments, the acousto-optic device is an acousto-optic deflector. The acousto-optic device in the subject system is configured to generate angularly deflected laser beams from the light from the laser and the applied radiofrequency drive signals. The radiofrequency drive signals may be applied to the acousto-optic device with any suitable radiofrequency drive signal source, such as a direct digital synthesizer (DDS), arbitrary waveform generator (AWG), or electrical pulse generator.

In embodiments, a controller is configured to apply radiofrequency drive signals to the acousto-optic device to produce the desired number of angularly deflected laser beams in the output laser beam, such as being configured to apply 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including being configured to apply 100 or more radiofrequency drive signals.

In some instances, to produce an intensity profile of the angularly deflected laser beams in the output laser beam, the controller is configured to apply radiofrequency drive signals having an amplitude that varies such as from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain embodiments, the controller has a processor having memory operably coupled to the processor such that the memory includes instructions stored thereon, which when executed by the processor, cause the processor to produce an output laser beam with angularly deflected laser beams having a desired intensity profile. For example, the memory may include instructions to produce two or more angularly deflected laser beams with the same intensities, such as 3 or more, such as 4 or more, such as 5 or more, such as 10 or more, such as 25 or more, such as 50 or more and including memory may include instructions to produce 100 or more angularly deflected laser beams with the same intensities. In other embodiments, the may include instructions to produce two or more angularly deflected laser beams with different intensities, such as 3 or more, such as 4 or more, such as 5 or more, such as 10 or more, such as 25 or more, such as 50 or more and including memory may include instructions to produce 100 or more angularly deflected laser beams with different intensities.

In certain embodiments, the controller has a processor having memory operably coupled to the processor such that the memory includes instructions stored thereon, which when executed by the processor, cause the processor to produce an output laser beam having increasing intensity from the edges to the center of the output laser beam along the horizontal axis. In these instances, the intensity of the angularly deflected laser beam at the center of the output beam may range from 0.1% to about 99% of the intensity of the angularly deflected laser beams at the edge of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the edge of the output laser beam along the horizontal axis. In other embodiments, the controller has a processor having memory operably coupled to the processor such that the memory includes instructions stored thereon, which when executed by the processor, cause the processor to produce an output laser beam having an increasing intensity from the edges to the center of the output laser beam along the horizontal axis. In these instances, the intensity of the angularly deflected laser beam at the edges of the output beam may range from 0.1% to about 99% of the intensity of the angularly deflected laser beams at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the center of the output laser beam along the horizontal axis. In yet other embodiments, the controller has a processor having memory operably coupled to the processor such that the memory includes instructions stored thereon, which when executed by the processor, cause the processor to produce an output laser beam having an intensity profile with a Gaussian distribution along the horizontal axis. In still other embodiments, the controller has a processor having memory operably coupled to the processor such that the memory includes instructions stored thereon, which when executed by the processor, cause the processor to produce an output laser beam having a top hat intensity profile along the horizontal axis.

In embodiments, light beam generators of interest may be configured to produce angularly deflected laser beams in the output laser beam that are spatially separated. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, systems are configured to produce angularly deflected laser beams in the output laser beam that overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, light beam generators configured to generate two or more beams of frequency shifted light include laser excitation modules as described in U.S. Pat. Nos. 9,423,353; 9,784,661 and 10,006,852 and U.S. Patent Publication Nos. 2017/0133857 and 2017/0350803, the disclosures of which are herein incorporated by reference.

Systems of interest may also include one or more optical adjustment components. As used herein, the term "optical adjustment" refers to any device that is capable of changing the spatial width of irradiation or some other characteristic of irradiation from a light source, such as for example, irradiation direction, wavelength, beam profile, beam width, beam intensity, focal point and pulse width. In some embodiments, systems may include an optical adjustment component that adjusts one or more of irradiation direction, wavelength, beam profile, beam width, beam intensity, focal point and pulse width of the laser.

In other embodiments, systems may also include an optical adjustment component that adjusts the light collected from the flow stream. In some instances, the optical adjustment component adjusts the focal point of light from the flow stream from each of the lasers. In other instances, the optical adjustment component adjusts the size of each beam spot from each of the lasers on the light collection component (e.g., single fiber optic). For instance, the optical adjustment component may be configured to decrease the size of each beam spot on the light collection component by 0.001 µm or more, such as by 0.005 µm or more, such as by 0.01 µm or more, such as by 0.05 µm or more, such as by 0.1 µm or more, such as by 0.2 µm, such as by 0.3 µm or more, such as by 0.4 µm or more, such as by 0.5 µm or more, such as by 0.6 µm or more, such as by 0.7 µm or more, such as by 0.8 µm or more, such as by 0.9 µm or more and including by 1.0 µm or more. In some embodiments, the optical adjustment component is configured to decrease the size of each beam spot on the light collection component by 10% or more, such as by 25% or more, such as by 50% or more, such as by 75% or more, such as by 90% or more and including by 95% or more. In certain instances, the optical adjustment component is configured to decrease the size of each beam spot on the light collection component by 1.5-fold or more, such as by 2-fold or more, such as by 3-fold or more, such as by 4-fold or more, such as by 5-fold or more and including by 10-fold or more.

In still other instances, the optical adjustment component is configured to adjust the space between each beam spot from each of the lasers on the light collection component, such as where the optical adjustment component decreases the space between each beam spot by 0.01 µm or more, such as by 0.05 µm or more, such as by 0.1 µm or more, such as by 0.5 µm or more, such as by 1 µm or more, such as by 2 µm, such as by 3 µm or more, such as by 4 µm or more, such as by 5 µm or more, such as by 6 µm or more, such as by 7 µm or more, such as by 8 µm or more, such as by 9 µm or more and including by 10 µm or more. For instance, the optical adjustment component may be configured to decrease the space between each beam spot by 5% or more, such as by 10% or more, such as by 25% or more, such as by 50% or more, such as by 75% or more, such as by 90% or more and including by 95% or more. In certain instances, the optical adjustment component is configured to decrease the space between each beam spot by 1.5-fold or more, such as by 2-fold or more, such as by 3-fold or more, such as by 4-fold or more, such as by 5-fold or more and including by 10-fold or more.

In embodiments, optical adjustment components may include but not are limited to lenses, mirrors, filters, fiber optics, wavelength separators, pinholes, slits, collimating protocols and combinations thereof. In certain embodiments, systems of interest include one or more focusing lenses. The focusing lens, in one example may be a de-magnifying lens. In another example, the focusing lens is a magnifying lens. In other embodiments, systems of interest include one or more mirrors.

In embodiments, light from the flow stream is collected with a light collection component and conveyed to the photodetector array. In some embodiments, the light collection component includes fiber optics. For example, in some instances the optical collection system may be a fiber optics light relay bundle and light is conveyed through the fiber optics light relay bundle to the photodetector array. In certain embodiments, the light collection component is a single fiber optic. The single fiber optic, according to some instances, has a light receiving end having a diameter of from 5 μm to 1000 μm, such as from 10 μm to 900 μm, such as from 20 μm to 800 μm, such as from 30 μm to 700 μm, such as from 40 μm to 600 μm, such as from 50 μm to 500 μm, such as from 60 μm to 400 μm, such as from 70 μm to 300 μm, such as from 80 μm to 200 μm and including from 100 μm to 200 μm. The light propagating end of the single fiber optic may have a diameter of from 5 μm to 1000 μm, such as from 10 μm to 900 μm, such as from 20 μm to 800 μm, such as from 30 μm to 700 μm, such as from 40 μm to 600 μm, such as from 50 μm to 500 μm, such as from 60 μm to 400 μm, such as from 70 μm to 300 μm, such as from 80 μm to 200 μm and including from 100 μm to 200 μm.

In some embodiments, the positions of irradiation spanned by the lasers on the flow stream is equal to or less than the diameter of the single fiber optic configured to collect light from the flow stream. For example, lasers in the subject systems may be configured to irradiate positions on the flow stream that span 100 μm or less, such as 90 μm or less, such as 80 μm or less, such as 70 μm or less, such as 60 μm or less and including 50 μm or less and the single fiber optic may have a diameter which is sufficient to collect light from each of the positions irradiated by the lasers, such as a diameter of 50 μm or more, such as 60 μm or more, such as 70 μm or more, such as 80 μm or more, such as 90 μm or more and including where the single fiber optic is configured to collect light from the irradiated flow stream is 100 μm or more.

The light collection component may be physically coupled to the single photodetector array, such as with an adhesive, co-molded together or integrated into the photodetector array. In certain embodiments, the light collection component and the photodetector array are integrated into a single unit. In other embodiments, the light collection component is coupled to the photodetector array with a connector, such as with a hook and loop fasteners, magnets, latches, notches, countersinks, counter-bores, grooves, pins, tethers, hinges, Velcro, non-permanent adhesives or a combination thereof.

In other embodiments, the photodetector array and the light collection component are in optical communication, but are not physically in contact. For example, the light collection component may be positioned 0.001 mm or more from the photodetector array, such as 0.005 mm or more, such as 0.01 mm or more, such as 0.05 mm or more, such as 0.1 mm or more, such as 0.5 mm or more, such as 1 mm or more, such as 10 mm or more, such as 25 mm or more, such as 50 mm or more and including 100 mm or more from the photodetector array.

In embodiments, the light detection system includes a single photodetector array having a plurality of photodetectors. The term "photodetector array" is used in its conventional sense to refer to an arrangement or series of two or more photodetectors that are configured to detect light. In certain embodiments, the photodetector array includes 4 or more photodetectors, such as 5 photodetectors or more, such as 10 photodetectors or more, such as 25 photodetectors or more and including 50 photodetectors or more.

Photodetectors in the subject systems may be any convenient light detecting protocol, including but not limited to photosensors or photodetectors, such as active-pixel sensors (APSs), quadrant photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, one or more of the photodetectors is a hybrid photodetector that includes a photocathode integrated with an avalanche diode. In some instances, the photocathode of the hybrid photodetector is a GaAs/GaAsP photocathode.

The photodetectors may be arranged in the photodetector array in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular patterned configurations. The photodiodes in the photodiode array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°. The photodiode array may be any suitable shape and may be a rectilinear shape, e.g., squares, rectangles, trapezoids, triangles, hexagons, etc., curvilinear shapes, e.g., circles, ovals, as well as irregular shapes, e.g., a parabolic bottom portion coupled to a planar top portion. In certain embodiments, the photodiode array has a rectangular-shaped active surface.

Each photodetector in the array may have an active surface with a width that ranges from 5 μm to 250 μm, such as from 10 μm to 225 μm, such as from 15 μm to 200 μm, such as from 20 μm to 175 μm, such as from 25 μm to 150 μm, such as from 30 μm to 125 μm and including from 50 μm to 100 μm and a length that ranges from 5 μm to 250 μm, such as from 10 μm to 225 μm, such as from 15 μm to 200 μm, such as from 20 μm to 175 μm, such as from 25 μm to 150 μm, such as from 30 μm to 125 μm and including from 50 μm to 100 μm, where the surface area of each photodiode in the array ranges from 25 to μm$^2$ to 10000 μm$^2$, such as from 50 to μm$^2$ to 9000 μm$^2$, such as from 75 to μm$^2$ to 8000 μm$^2$, such as from 100 to μm$^2$ to 7000 μm$^2$, such as from 150 to μm$^2$ to 6000 μm$^2$ and including from 200 to μm$^2$ to 5000 μm$^2$.

The size of the photodetector array may vary depending on the amount and intensity of the light, the number of photodiodes and the desired sensitivity and may have a length that ranges from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. The width of the photodiode array may also vary, ranging from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. As such, the active surface of the photodiode array may range from 0.1 mm$^2$ to 10000 mm$^2$, such as from 0.5 mm$^2$ to 5000 mm$^2$, such as from 1 mm$^2$ to 1000 mm$^2$, such as from 5 mm$^2$ to 500 mm$^2$, and including from 10 mm$^2$ to 100 mm$^2$.

Photodetectors of interest are configured to measure collected light at one or more wavelengths, such as at 2 or more wavelengths, such as at 5 or more different wavelengths, such as at 10 or more different wavelengths of light, such as 15 or more, such as 25 or more, such as 50 or more, such as 100 or more, such as 200 or more, such as 300 or, such as 400 or more, such as 500 or more, such as 1000 or more, such as 1500 or more, such as 2500 or more and including 5000 or more different wavelengths of light. In certain embodiments, photodetectors are configured to measure a spectrum of light, such as where the spectrum of light includes wavelengths which span 50 nm or more, such as 100 nm or more, such as 200 nm or more, such as 300 nm or more, such as 400 nm or more, such as 500 nm or more, such as 600 or more, such as 700 nm or more, such as 800 nm or more, such as 900 nm or more, such as 1000 nm or more and including 1500 nm or more. For instance, photodetectors are configured to measure light in a range from 200 nm to 1500 nm, such as from 400 nm to 1100 nm.

The light detection system is configured to measure light continuously or in discrete intervals. In some instances, photodetectors of interest are configured to take measurements of the collected light continuously. In other instances, the light detection system is configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In some embodiments, the photodetector array is configured to propagate light between each photodetector in the array, such as with mirrors, beam splitters or lenses. In some embodiments, each photodetector in the photodetector array is in optical communication with an optical adjustment component configured to restrict one or more wavelengths of light from being detected by the photodetector. In some embodiments, the optical adjustment component is a bandpass filter. In other embodiments, the optical adjustment component is a dichroic mirror. In certain embodiments, photodetector arrays of interest include a dichroic mirror adjacent to one or more of the photodetectors in the array, such as a dichroic mirror adjacent to two or more of the photodetectors in the array, such as a dichroic mirror adjacent to three or more of the photodetectors in the array, such as a dichroic mirror adjacent to four or more of the photodetectors in the array, such as a dichroic mirror adjacent to five or more of the photodetectors in the array, such as a dichroic mirror adjacent to six or more of the photodetectors in the array, such as a dichroic mirror adjacent to seven or more of the photodetectors in the array and including a dichroic mirror adjacent to eight or more of the photodetectors in the array. In certain instances, photodetector arrays include a dichroic mirror adjacent to each of the photodetectors in the array. In other embodiments, photodetector arrays include one or more beam splitters for propagating light to each of the photodetectors. For example, the photodetector array may include two or more beam splitters, such as three or more beam splitters, such as four or more beam splitters, such as five or more beam splitters, such as six or more beam splitters, such as seven or more beam splitters, such as eight or more beam splitters, such as nine or more beam splitters and including ten or more beam splitters.

In some embodiments, the photodetectors in the photodetector array are configured to each detect light at different times. In some instances, light is propagated sequentially across each of the photodetectors in the array, such as where light is detected by a first photodetector (detector$_{N1}$) at a first time ($t_{N1}$), propagated to a second photodetector (detector$_{N2}$) and detected at a second time ($t_{N2}$), followed by light propagation to each of the further photodetectors (detector$_{N+X}$) and detected at times ($t_{N+X}$). In these embodiments, light detection by the photodetectors in the photodetector array is time separated. In some embodiments, detection of light by each of the photodetectors in the photodetector array is time-separated by 0.01 ps or more, such as by 0.05 ps or more, such as by 0.1 ps or more, such as by 0.5 ps or more, such as by 1.0 ps or more, such as by 2 ps or more, such as by 3 ps or more, such as by 4 ps or more, such as by 5 ps or more, such as by 10 ps or more, such as by 25 ps or more, such as by 50 ps or more, such as by 75 ps or more, such as by 100 ps or more and including by 500 ps or more. As described in greater detail below, generated light signals from each of the photodetectors may be time-separated data signals. In certain instances, time-separated light detection according to some embodiments of the present disclosure provide for reduced photon coincidence at a photodetector in the photodetector array, including where there is no photon coincidence at any of the photodetectors in the photodetector array.

In some embodiments, each photodetector in the photodetector array is configured to differentially detect light from the flow stream. In some embodiments, the photodetector array is configured to detect two or more predetermined sets of wavelengths of light, such as where the photodetector array detects 3 or more different sets of wavelengths of light, such as 4 or more, such as 5 or more, such as 6 or more, such as 7 or more, such as 8 or more, such as 9 or more, such as 10 or more, such as 11 or more and including 12 or more different sets of wavelengths of light. Each predetermined set of wavelengths of light may include 5 or more different wavelengths of light, such as 10 or more, such as 15 or more, such as 25 or more, such as 50 or more, such as 100 or more, such as 200 or more, such as 300 or, such as 400 or more, such as 500 or more, such as 1000 or more, such as 1500 or more, such as 2500 or more and including 5000 or more different wavelengths of light.

In certain embodiments, each photodetector is configured to detect a predetermined spectral range of light, $X_s$ (in nanometers, nm). The predetermined spectral ranges may vary, where in certain embodiments, photodetectors of interest are configured to detect spectral ranges ($X_s$) of light that span from 50 nm to 300 nm, such as from 75 nm to 275 nm, such as from 100 nm to 250 nm, such as from 125 nm to 225 nm and including from 150 nm to 200 nm. In certain embodiments, each photodetector is configured to detect a spectral range of light that spans 100 nm (i.e., $X_s$=100 nm).

FIG. 5A depicts a system for irradiating a particle in a flow stream according to certain embodiments. Lasers 501, 502, 503, 504 and 505 irradiate a flow stream at positions, 501*a* 502*a*, 503*a*, 504*a* and 505*a*, respectively. Light from the flow stream is collected with focusing lens 506 and conveyed to the light receiving end of fiber optic 507. The collected light is conveyed through fiber optic 507 to photodetector array 508 which propagates light to each of photodetectors $d_1$, $d_2$, $d_3$, $d_4$, $d_5$, $d_6$, $d_7$, $d_8$, $d_9$, $d_{10}$, $d_{11}$ and $d_n$.

FIG. 5B depicts data signals from light detected by photodetectors of a photodetector array according to certain embodiments. As shown in FIG. 5B, each of photodetectors $d_1$, $d_2$, $d_3$, $d_4$, $d_5$, $d_6$, $d_7$, $d_8$, $d_9$, $d_{10}$, $d_{11}$ and $d_n$ (depicted in FIG. 5A) differentially detects light conveyed from light collection component 507. Detectors $d_1$, $d_2$, $d_3$, $d_4$, $d_5$, $d_6$, $d_7$, $d_8$, $d_9$, $d_{10}$, $d_{11}$ and $d_n$ are configured to generate a data signal for all wavelengths of light conveyed from lasers 501 and 502. Detectors $d_3$, $d_4$, $d_5$, $d_6$, $d_7$, $d_8$, $d_9$, $d_{10}$, $d_{11}$ and $d_n$ are configured to generate data signals for light detected from laser 503. Detectors $d_5$, $d_6$, $d_7$, $d_8$, $d_9$, $d_{10}$, $d_{11}$ and $d_n$ are configured to generate data signals for light detected from laser 504. Detectors $d_6$, $d_7$, $d_8$, $d_9$, $d_{10}$, $d_{11}$ and $d_n$ are configured to generate data signals for light detected from laser 505.

In certain embodiments, photodetectors in the photodetector array are configured to detect light from one or more specific lasers of the light source. In some instances, each laser is assigned to one or more of the photodetectors such that light from the laser (e.g., as scattered light from the flow stream or fluorescence from a fluorophore irradiated by the laser in the flow stream) is detected by the one or more assigned photodetectors in the photodetector array. Depending on the number of lasers in the light source (as described above) and the number of photodetectors in the photodetector array, light from each laser may be assigned to two or more photodetectors, such as 3 or more photodetectors, such as 4 or more, photodetectors, such as 5 or more photodetectors, such as 6 or more photodetectors, such as 8 or more photodetectors, such as 10 or more photodetectors and including 12 or more photodetectors. In certain embodiments, light from a laser in the light source may be detected by all of the photodetectors of the photodetector array. In other embodiments, light from a laser in the light source may be detected by 90% (e.g., 9 out of 10 photodetectors) or less of the photodetectors in the photodetector array, such as 80% (e.g., 16 out of 20 photodetectors) or less, such as 75% (e.g., 9 out of 12 photodetectors) or less and including 50% (e.g., 8 out of 16 photodetectors) or less of the photodetectors in the photodetector array. In some embodiments, systems include a processor systems also include a processor having memory operably coupled to the processor where the memory includes instructions stored thereon, which when executed by the processor, cause the processor to assign each photodetector in the photodetector array to detect one or more predetermined sets of wavelengths of light, such as light from one or more the lasers in the light source.

Figure 6:
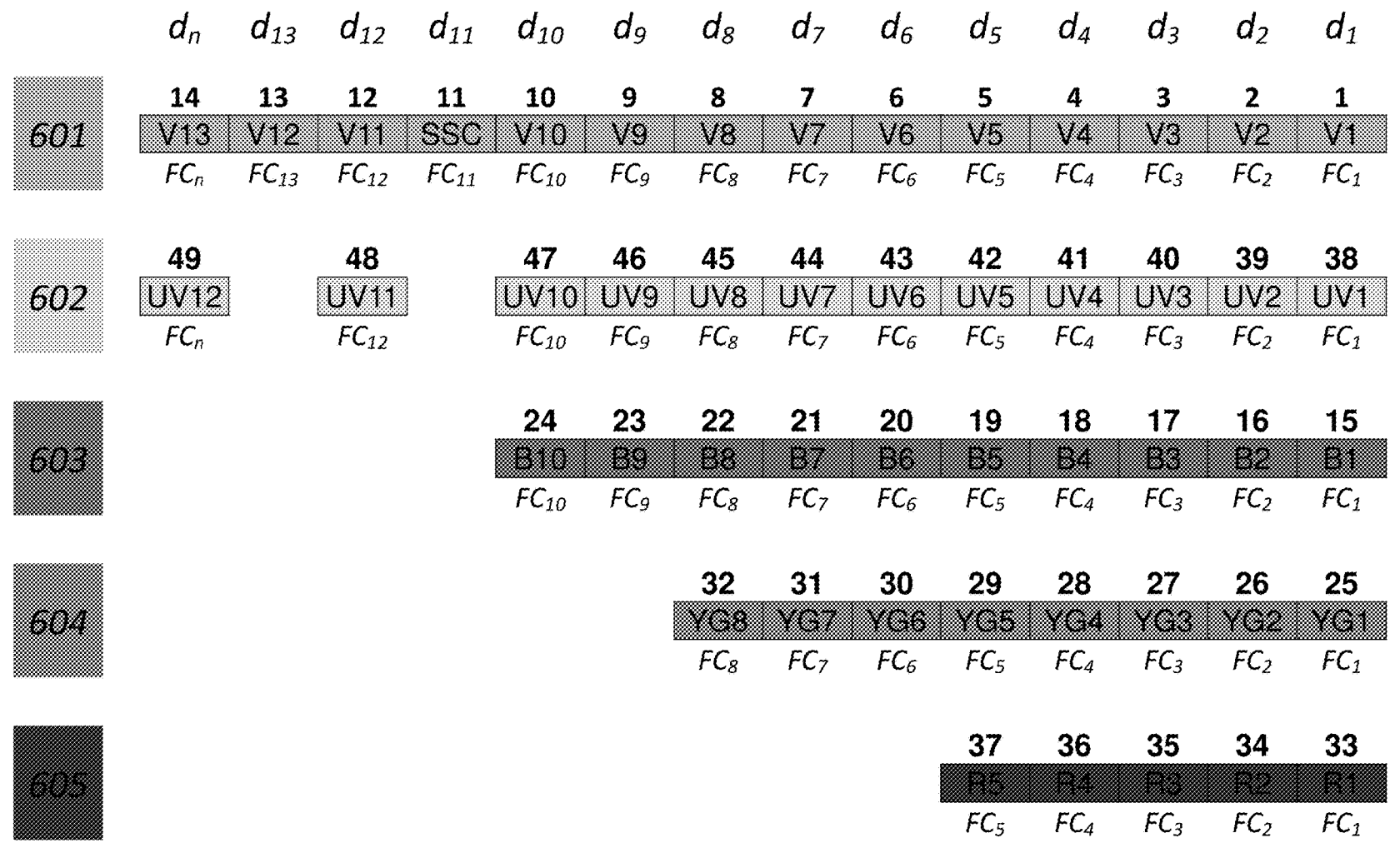

FIG. 6 depicts the multiplexing configuration of photodetectors in a photodetector array according to certain embodiments. As shown in FIG. 6, light from lasers 601, 602, 603, 604 and 605 are detected by photodetectors $d_1$, $d_2$, $d_3$, $d_4$, $d_5$, $d_6$, $d_7$, $d_8$, $d_9$, $d_{10}$, $d_{11}$, $d_{12}$, $d_{13}$ and $d_n$. Generated data signals outputted from each of the photodetectors are assigned a designated data channel (e.g., V13, SSC, UV12). The assignment also includes data pertaining to the type of bandpass filter (e.g., $FC_1$-$FC_n$) optically coupled to the photodetector and mapping location (e.g., Nos. 1-37)

In some embodiments, systems are configured to determine one or more parameters of a particle in a flow stream. In embodiments, each photodetector in the photodetector array is configured to generate one or more data signals in response to detected light. In some embodiments, data signals generated by the photodetector array are multiplexed data signals. In some embodiments, the light detection system is configured for time-division multiplexing where time discrimination is used to separate distinct photons conveyed by the single light collection component to the photodetector array (e.g., single fiber optic). As described above, each photodetector may be configured to detect light from the flow stream at different times and the outputted data signals from the plurality of photodetectors may be multiplexed. In these embodiments, a time-division multiplexed data signal may be outputted to a processor. For example, the time-division multiplexed data signal may include generated data signals from light detected at 2 or more different times, such as at 4 or more different times, such as at 8 or more different times, such as at 16 or more different times, such as at 6 or more different times, such as at 32 or more different times, such as at 64 or more different times, such as at 128 or more different times and including at 256 or more different times.

In other embodiments, the light detection system is configured for wavelength-division multiplexing where different wavelengths of light from the flow stream are conveyed through the single light collection component and detected by the plurality of photodetectors of the photodetector array. As described above, each photodetector may be configured to detect one or more predetermined sets of wavelengths of light. In these embodiments, the outputted data signals generated by the predetermined set of wavelengths of light from the plurality of photodetectors is multiplexed and a wavelength-division multiplexed data signal is outputted to a processor. For example, the wavelength-division multiplexed data signal may include generated data signals from 2 or more different predetermined sets of wavelengths of light, such as 3 or more, such as 4 or more, such as 5 or more, such as 6 or more, such as 7 or more, such as 8 or more, such as 9 or more, such as 10 or more, such as 11 or more and including a wavelength-division multiplexed data signal that includes generated data signals from 12 or more predetermined sets of wavelengths of light. In certain embodiments, the wavelength-division multiplexed data signal includes generated data signals from 2 or more different spectra of light detected by the photodetectors, such as 3 or more, such as 4 or more, such as 5 or more, such as 6 or more, such as 7 or more, such as 8 or more, such as 9 or more, such as 10 or more, such as 11 or more and including a wavelength-division multiplexed data signal that includes generated data signals from 12 or more different spectra of light detected by the photodetectors.

In some embodiments, the system includes the memory having instructions stored thereon, which when executed by the processor, cause the processor to spectrally resolve light detected by the photodetectors of the photodetector array. The term "spectrally resolving" is used herein in its conventional sense to refer to spectrally distinguishing light from the flow stream by assigning or attributing the overlapping wavelengths of light to each contributing component (e.g., fluorophore in the flow stream, scattered light from each laser). In certain embodiments, the overlapping spectral component of the light is determined by calculating a spectral unmixing matrix (as described in greater detail below). In some embodiments, a spectrum of light detected by each photodetector overlaps with the spectrum of light detected by at least one other detector in the photodetector array. In some instances, the spectrum of light detected by a photodetector in the photodetector array overlaps with the spectrum of light of at least one other detector by 5 nm or more, such as by 10 nm or more, such as by 25 nm or more and including by 50 nm or more. In certain instances, the spectrum of light detected by a photodetector overlaps with the spectra of two or more other photodetectors in the photodetector array, such as where each overlap is by 5 nm or more, such as by 10 nm or more, such as by 25 nm or more and including by 50 nm or more. In other embodiments, the spectra of light detected by a photodetectors in the photodetector array have non-overlapping spectra. In these embodiments, the spectrum of light detected by each photodetector is adjacent to the spectrum of at least one other photodetector within 10 nm or less, such as 9 nm or less, such as 8 nm or less, such as 7 nm or less, such as 6 nm or less, such as 5 nm or less, such as 4 nm or less, such as 3 nm or less, such as 2 nm or less and including 1 nm or less.

In some embodiments, systems include a processor having memory operably coupled to the processor where the memory includes instructions stored thereon, which when executed by the processor, cause the processor to spectrally resolve the light from each photodetector in the photodetector array. In some embodiments, the overlap of the spectra of light from the flow stream is determined and the contribution of each to the overlapping detected light spectra is calculated. In some embodiments, spectrally resolving light includes calculating a spectral unmixing matrix. In certain embodiments, calculating a spectral unmixing matrix may be used to estimate the abundance of each contribution to the detected light signal by the photodetectors in the photodetector array.

In some instances, calculating the spectral unmixing matrix includes determining the abundance of a fluorophore associated with a target particle in the flow stream. The abundance of each fluorophore associated with a target particle may be used in identifying and classifying a particle. In some instances, identified or classified particles may be used to sort target particles (e.g., cells) in the sample. In certain embodiments, calculating spectral unmixing, is conducted so that sorting is sufficiently fast to sort particles in real time after detection by the light detection system.

In certain embodiments, systems are configured to spectrally resolve light detected by the plurality of photodetectors in the photodetector array as described e.g., in International Patent Application No. PCT/US2019/068395 filed on Dec. 23, 2019, the disclosure of which is herein incorporated by reference in its entirety. For example, light detected by the plurality of photodetectors in the photodetector array may be spectrally resolved by solving a spectral unmixing matrix using one or more of: 1) a weighted least square algorithm; 2) a Sherman-Morrison iterative inverse updater; 3) an LU matrix decomposition, such as where a matrix is decomposed into a product of a lower-triangular (L) matrix and an upper-triangular (U) matrix; 4) a modified Cholesky decomposition; 5) by QR factorization; and 6) calculating a weighted least squares algorithm by singular value decomposition.

In certain embodiments, the light source and light detection systems having a single light collection component (e.g., a single fiber optic) and single photodetector array as described above are part of or positioned in a particle analyzer, such as a particle sorter. In certain embodiments, the subject systems are part of or positioned in a flow cytometric system. Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem*. January; 49(pt 1):17-28; Linden, et. al., *Semin Throm Hemost*. 2004 October; 30(5):502-11; Alison, et al. *J Pathol,* 2010 December; 222(4):335-344; and Herbig, et al. (2007) *Crit Rev Ther Drug Carrier Syst*. 24(3):203-255; the disclosures of which are incorporated herein by reference. In certain instances, flow cytometry systems of interest include BD Biosciences FACSCanto™ II flow cytometer, BD Accuri™ flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer BD Biosciences LSRFortessa™ flow cytometer, BD Biosciences LSRFortess™ X-20 flow cytometer and BD Biosciences FACSCalibur™ cell sorter, a BD Biosciences FACSCount™ cell sorter, BD Biosciences FACSLyric™ cell sorter and BD Biosciences Via™ cell sorter BD Biosciences Influx™ cell sorter, BD Biosciences Jazz™ cell sorter, BD Biosciences Aria™ cell sorters and BD Biosciences FACSMelody™ cell sorter, or the like.

In some embodiments, the subject particle analyzer systems are flow cytometric systems, such those described in U.S. Pat. Nos. 10,006,852; 9,952,076; 9,933,341; 9,784,661; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; the disclosure of which are herein incorporated by reference in their entirety.

In certain embodiments, the subject systems are configured to sort one or more of the particles (e.g., cells) of the sample. The term "sorting" is used herein in its conventional sense to refer to separating components (e.g., cells, non-cellular particles such as biological macromolecules) of the sample and in some instances delivering the separated components to one or more sample collection containers. For example, the subject systems may be configured for sorting samples having 2 or more components, such as 3 or more components, such as 4 or more components, such as 5 or more components, such as 10 or more components, such as 15 or more components and including soring a sample having 25 or more components. One or more of the sample components may be separated from the sample and delivered to a sample collection container, such as 2 or more sample components, such as 3 or more sample components, such as 4 or more sample components, such as 5 or more sample components, such as 10 or more sample components and including 15 or more sample components may be separated from the sample and delivered to a sample collection container.

In some embodiments, particle sorting systems of interest are configured to sort particles with an enclosed particle sorting module, such as those described in U.S. Patent Publication No. 2017/0299493, filed on Mar. 28, 2017, the disclosure of which is incorporated herein by reference. In certain embodiments, particles (e.g, cells) of the sample are sorted using a sort decision module having a plurality of sort decision units, such as those described in U.S. patent application Ser. No. 16/725,756, filed on Dec. 23, 2019, the disclosure of which is incorporated herein by reference. In some embodiments, methods for sorting components of sample include sorting particles (e.g., cells in a biological sample) with a particle sorting module having deflector plates, such as described in U.S. Patent Publication No. 2017/0299493, filed on Mar. 28, 2017, the disclosure of which is incorporated herein by reference.

FIG. 1 shows a functional block diagram for one example of a sorting control system, such as an analytics controller 100, for analyzing and displaying biological events. An analytics controller 100 can be configured to implement a variety of processes for controlling graphic display of biological events.

A particle analyzer or sorting system 102 can be configured to acquire biological event data. For example, a flow cytometer can generate flow cytometric event data. The particle analyzer 102 can be configured to provide biological event data to the analytics controller 100. A data communication channel can be included between the particle analyzer 102 and the analytics controller 100. The biological event data can be provided to the analytics controller 100 via the data communication channel.

The analytics controller 100 can be configured to receive biological event data from the particle analyzer 102. The biological event data received from the particle analyzer 102 can include flow cytometric event data. The analytics controller 100 can be configured to provide a graphical display including a first plot of biological event data to a display device 106. The analytics controller 100 can be further configured to render a region of interest as a gate around a population of biological event data shown by the display device 106, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The analytics controller 100 can be further configured to display the biological event data on the display device 106 within the gate differently from other events in the biological event data outside of the gate. For example, the analytics controller 100 can be configured to render the color of biological event data contained within the gate to be distinct from the color of biological event data outside of the gate. The display device 106 can be implemented as a monitor, a tablet computer, a smartphone, or other electronic device configured to present graphical interfaces.

The analytics controller 100 can be configured to receive a gate selection signal identifying the gate from a first input device. For example, the first input device can be implemented as a mouse 110. The mouse 110 can initiate a gate selection signal to the analytics controller 100 identifying the gate to be displayed on or manipulated via the display device 106 (e.g., by clicking on or in the desired gate when the cursor is positioned there). In some implementations, the first device can be implemented as the keyboard 108 or other means for providing an input signal to the analytics controller 100 such as a touchscreen, a stylus, an optical detector, or a voice recognition system. Some input devices can include multiple inputting functions. In such implementations, the inputting functions can each be considered an input device. For example, as shown in FIG. 1, the mouse 110 can include a right mouse button and a left mouse button, each of which can generate a triggering event.

The triggering event can cause the analytics controller 100 to alter the manner in which the data is displayed, which portions of the data is actually displayed on the display device 106, and/or provide input to further processing such as selection of a population of interest for particle sorting.

In some embodiments, the analytics controller 100 can be configured to detect when gate selection is initiated by the mouse 110. The analytics controller 100 can be further configured to automatically modify plot visualization to facilitate the gating process. The modification can be based on the specific distribution of biological event data received by the analytics controller 100.

The analytics controller 100 can be connected to a storage device 104. The storage device 104 can be configured to receive and store biological event data from the analytics controller 100. The storage device 104 can also be configured to receive and store flow cytometric event data from the analytics controller 100. The storage device 104 can be further configured to allow retrieval of biological event data, such as flow cytometric event data, by the analytics controller 100.

A display device 106 can be configured to receive display data from the analytics controller 100. The display data can comprise plots of biological event data and gates outlining sections of the plots. The display device 106 can be further configured to alter the information presented according to input received from the analytics controller 100 in conjunction with input from the particle analyzer 102, the storage device 104, the keyboard 108, and/or the mouse 110.

In some implementations the analytics controller 100 can generate a user interface to receive example events for sorting. For example, the user interface can include a control for receiving example events or example images. The example events or images or an example gate can be provided prior to collection of event data for a sample, or based on an initial set of events for a portion of the sample.

Figure 2A:
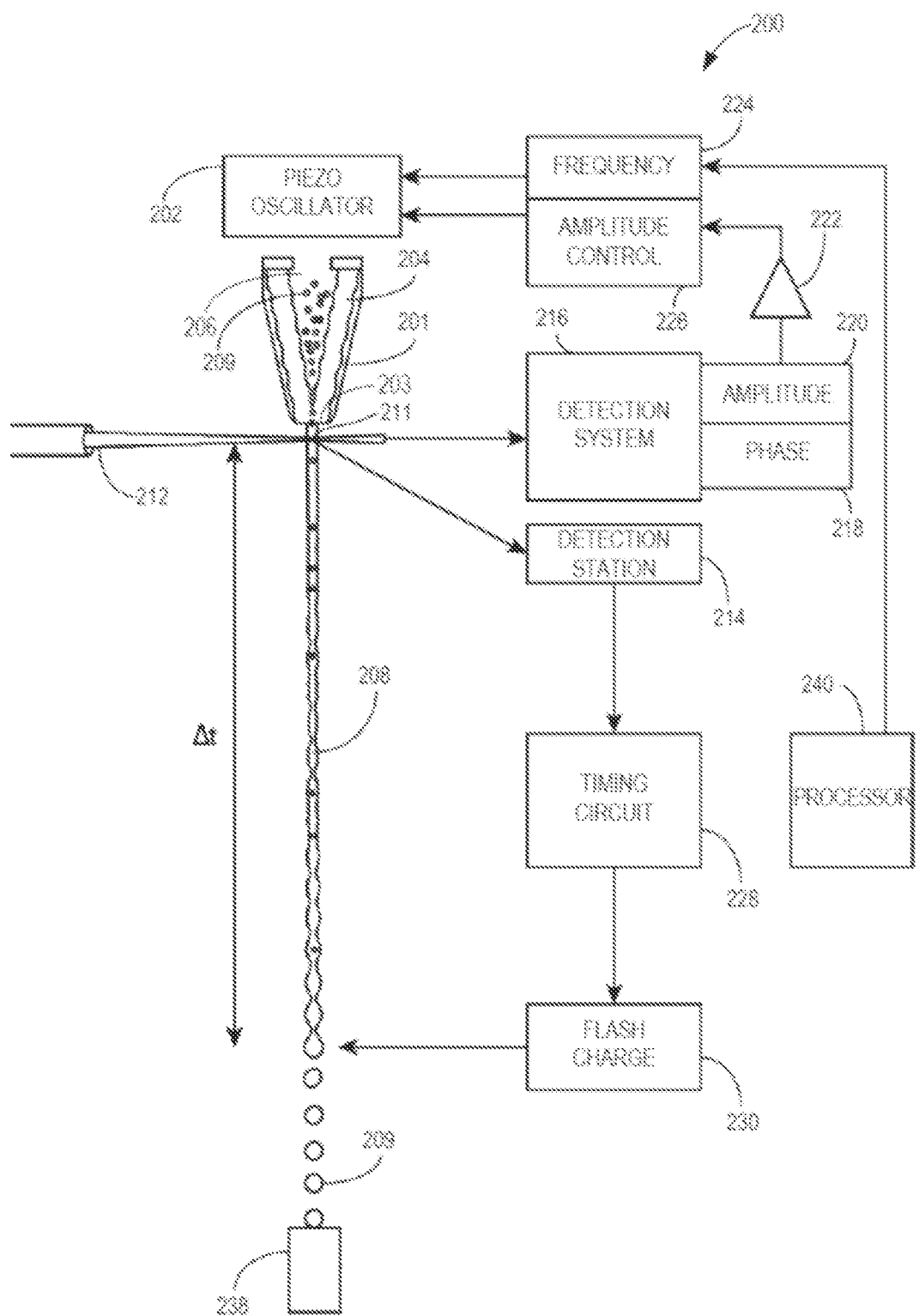
FIG. 2A depicts a schematic drawing of a particle sorter system according to certain embodiments.

FIG. 2A is a schematic drawing of a particle sorter system 200 (e.g., the particle analyzer 102) in accordance with one embodiment presented herein. In some embodiments, the particle sorter system 200 is a cell sorter system. As shown in FIG. 2A, a drop formation transducer 202 (e.g., piezo-oscillator) is coupled to a fluid conduit 201, which can be coupled to, can include, or can be, a nozzle 203. Within the fluid conduit 201, sheath fluid 204 hydrodynamically focuses a sample fluid 206 comprising particles 209 into a moving fluid column 208 (e.g. a stream). Within the moving fluid column 208, particles 209 (e.g., cells) are lined up in single file to cross a monitored area 211 (e.g., where laser-stream intersect), irradiated by an irradiation source 212 (e.g., a laser). Vibration of the drop formation transducer 202 causes moving fluid column 208 to break into a plurality of drops 210, some of which contain particles 209.

In operation, a detection station 214 (e.g., an event detector) identifies when a particle of interest (or cell of interest) crosses the monitored area 211. Detection station 214 feeds into a timing circuit 228, which in turn feeds into a flash charge circuit 230. At a drop break off point, informed by a timed drop delay (at), a flash charge can be applied to the moving fluid column 208 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 2A, the drops can be collected in a drain receptacle 238.

A detection system 216 (e.g. a drop boundary detector) serves to automatically determine the phase of a drop drive signal when a particle of interest passes the monitored area 211. An exemplary drop boundary detector is described in U.S. Pat. No. 7,679,039, which is incorporated herein by reference in its entirety. The detection system 216 allows the instrument to accurately calculate the place of each detected particle in a drop. The detection system 216 can feed into an amplitude signal 220 and/or phase 218 signal, which in turn feeds (via amplifier 222) into an amplitude control circuit 226 and/or frequency control circuit 224. The amplitude control circuit 226 and/or frequency control circuit 224, in turn, controls the drop formation transducer 202. The amplitude control circuit 226 and/or frequency control circuit 224 can be included in a control system.

In some implementations, sort electronics (e.g., the detection system 216, the detection station 214 and a processor 240) can be coupled with a memory configured to store the detected events and a sort decision based thereon. The sort decision can be included in the event data for a particle. In some implementations, the detection system 216 and the detection station 214 can be implemented as a single detection unit or communicatively coupled such that an event measurement can be collected by one of the detection system 216 or the detection station 214 and provided to the non-collecting element.

Figure 2B:
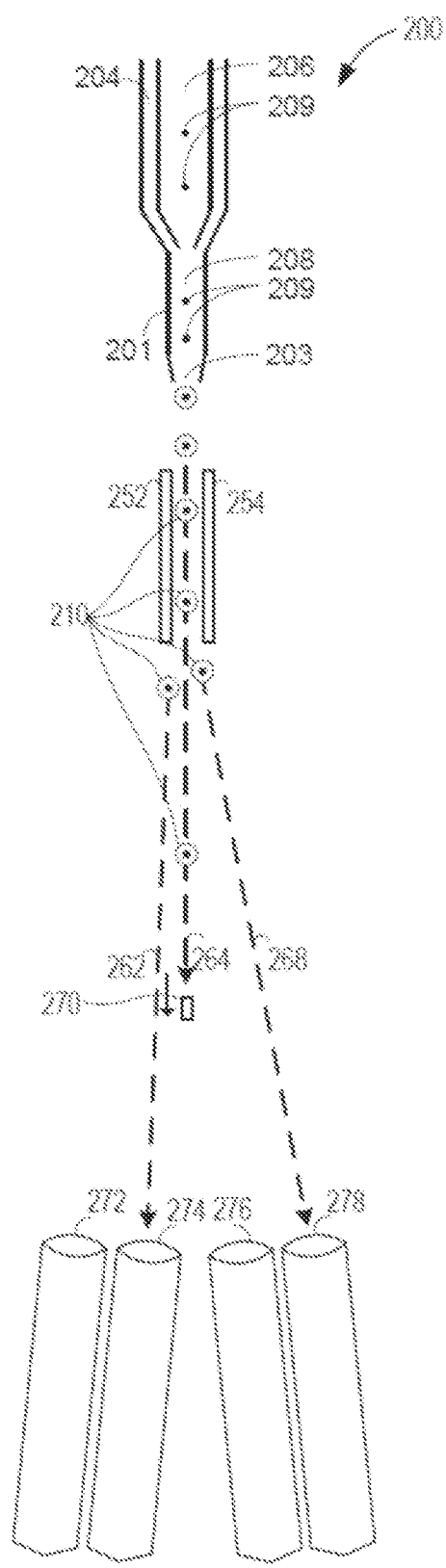
FIG. 2B depicts a schematic drawing of a particle sorter system according to certain embodiments.

FIG. 2B is a schematic drawing of a particle sorter system, in accordance with one embodiment presented herein. The particle sorter system 200 shown in FIG. 2B, includes deflection plates 252 and 254. A charge can be applied via a stream-charging wire in a barb. This creates a stream of droplets 210 containing particles 210 for analysis. The particles can be illuminated with one or more light sources (e.g., lasers) to generate light scatter and fluorescence information. The information for a particle is analyzed such as by sorting electronics or other detection system (not shown in FIG. 2B). The deflection plates 252 and 254 can be independently controlled to attract or repel the charged droplet to guide the droplet toward a destination collection receptacle (e.g., one of 272, 274, 276, or 278). As shown in FIG. 2B, the deflection plates 252 and 254 can be controlled to direct a particle along a first path 262 toward the receptacle 274 or along a second path 268 toward the receptacle 278. If the particle is not of interest (e.g., does not exhibit scatter or illumination information within a specified sort range), deflection plates may allow the particle to continue along a flow path 264. Such uncharged droplets may pass into a waste receptacle such as via aspirator 270.

The sorting electronics can be included to initiate collection of measurements, receive fluorescence signals for particles, and determine how to adjust the deflection plates to cause sorting of the particles. Example implementations of the embodiment shown in FIG. 2B include the BD FACSAria™ line of flow cytometers commercially provided by Becton, Dickinson and Company (Franklin Lakes, NJ).

In some embodiments, one or more components described for the particle sorter system 200 can be used to analyze and characterize particles, with or without physically sorting the particles into collection vessels. Likewise, one or more components described below for the particle analysis system 300 (FIG. 3) can be used to analyze and characterize particles, with or without physically sorting the particles into collection vessels. For example, particles can be grouped or displayed in a tree that includes at least three groups as described herein, using one or more of the components of the particle sorter system 200 or particle analysis system 300.

Figure 3:
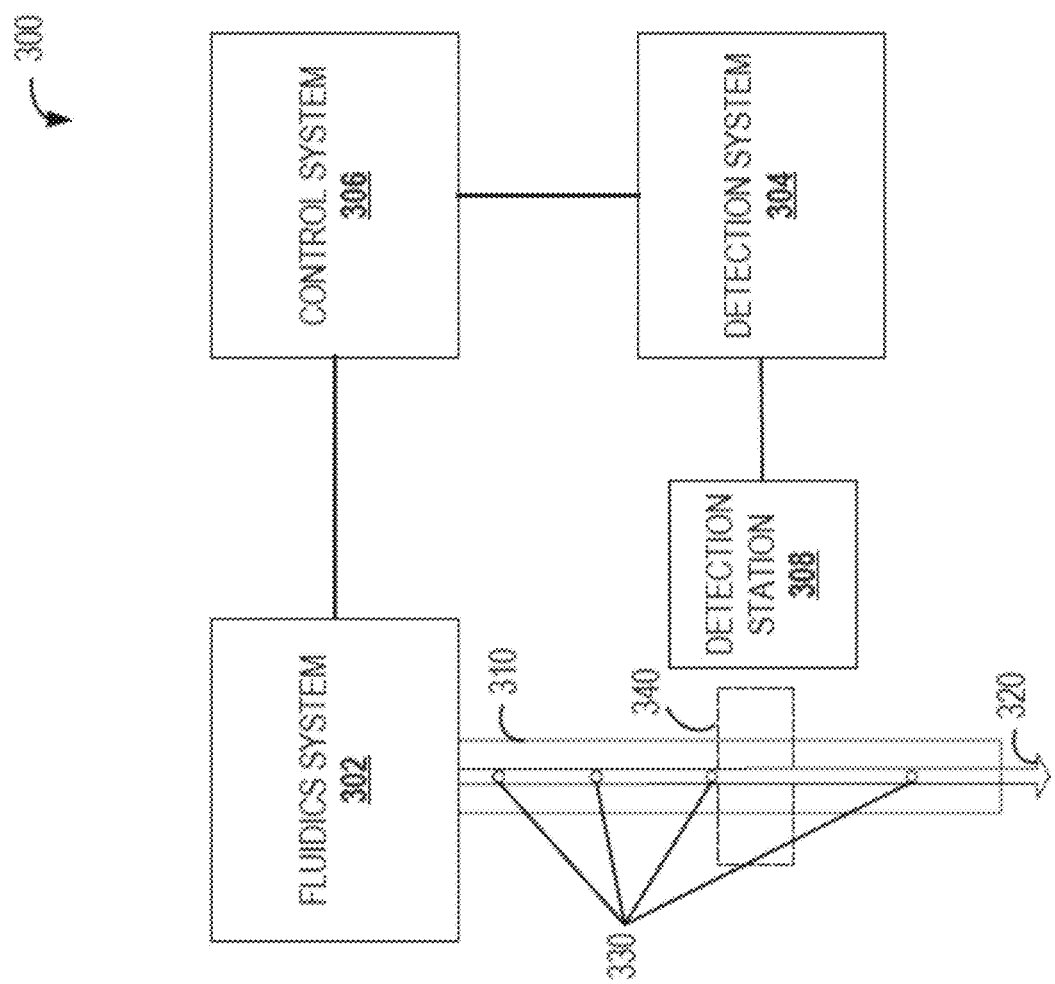
FIG. 3 depicts a functional block diagram of a particle analysis system for computational based sample analysis and particle characterization according to certain embodiments.

FIG. 3 shows a functional block diagram of a particle analysis system for computational based sample analysis and particle characterization. In some embodiments, the particle analysis system 300 is a flow system. The particle analysis system 300 shown in FIG. 3 can be configured to perform, in whole or in part, the methods described herein such as. The particle analysis system 300 includes a fluidics system 302. The fluidics system 302 can include or be coupled with a sample tube 310 and a moving fluid column within the sample tube in which particles 330 (e.g. cells) of a sample move along a common sample path 320.

The particle analysis system 300 includes a detection system 304 configured to collect a signal from each particle as it passes one or more detection stations along the common sample path. A detection station 308 generally refers to a monitored area 340 of the common sample path. Detection can, in some implementations, include detecting light or one or more other properties of the particles 330 as they pass through a monitored area 340. In FIG. 3, one detection station 308 with one monitored area 340 is shown. Some implementations of the particle analysis system 300 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 304 is configured to collect a succession of such data points in a first time interval.

The particle analysis system 300 can also include a control system 306. The control system 306 can include one or more processors, an amplitude control circuit 226 and/or a frequency control circuit 224 as shown in FIG. 2B. The control system 206 shown can be operationally associated with the fluidics system 302. The control system 206 can be configured to generate a calculated signal frequency for at least a portion of the first time interval based on a Poisson distribution and the number of data points collected by the detection system 304 during the first time interval. The control system 306 can be further configured to generate an experimental signal frequency based on the number of data points in the portion of the first time interval. The control system 306 can additionally compare the experimental signal frequency with that of a calculated signal frequency or a predetermined signal frequency.

Figure 4:
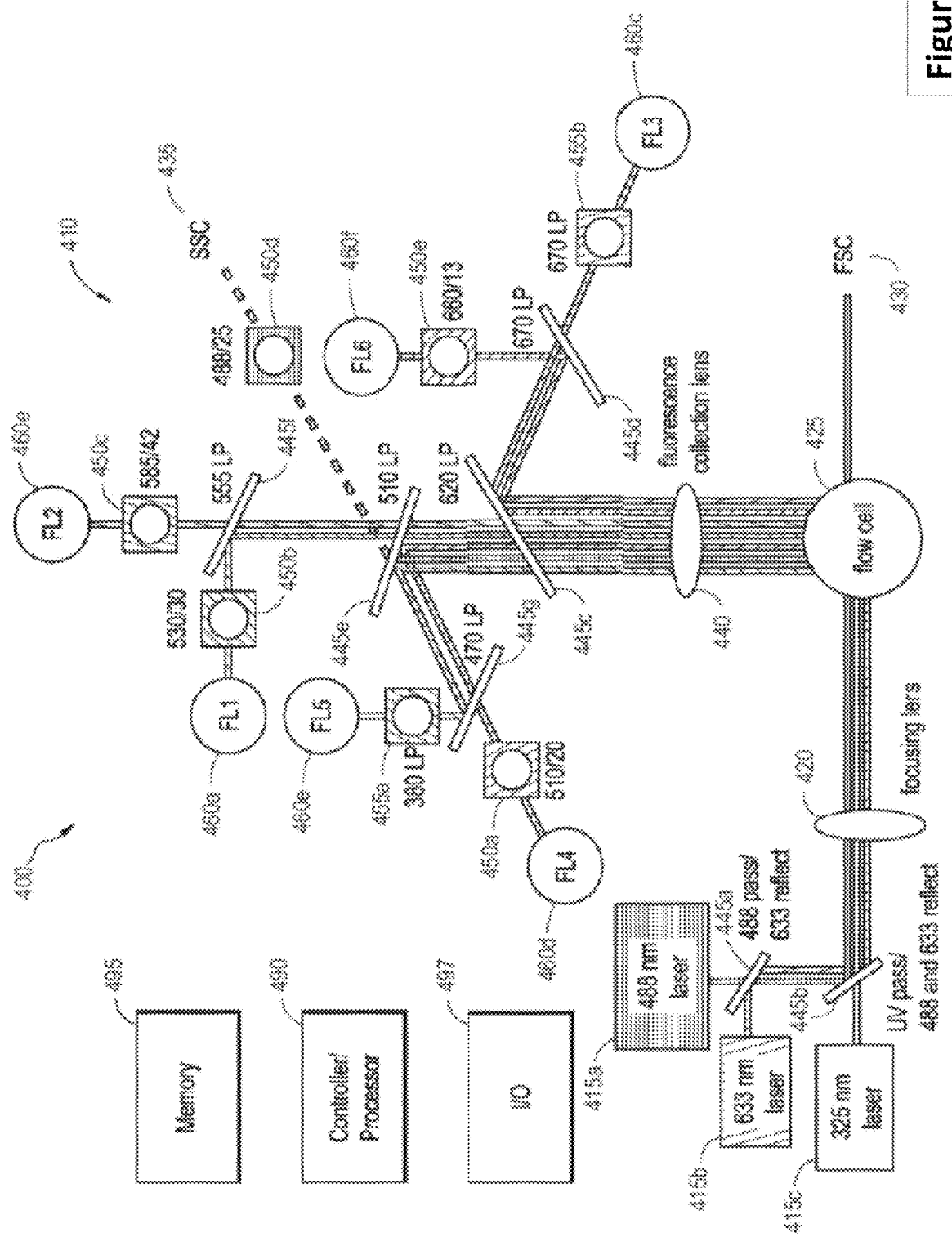
FIG. 4 depicts a flow cytometer according to certain embodiments.

FIG. 4 shows a system 400 for flow cytometry in accordance with an illustrative embodiment of the present invention. The system 400 includes a flow cytometer 410, a controller/processor 490 and a memory 495. The flow cytometer 410 includes one or more excitation lasers 415a-415c, a focusing lens 420, a flow chamber 425, a forward scatter detector 430, a side scatter detector 435, a fluorescence collection lens 440, one or more beam splitters 445a-445g, one or more bandpass filters 450a-450e, one or more longpass ("LP") filters 455a-455b, and one or more fluorescent detectors 460a-460f.

The excitation lasers 115a-c emit light in the form of a laser beam. The wavelengths of the laser beams emitted from excitation lasers 415a-415c are 488 nm, 633 nm, and 325 nm, respectively, in the example system of FIG. 4. The laser beams are first directed through one or more of beam splitters 445a and 445b. Beam splitter 445a transmits light at 488 nm and reflects light at 633 nm. Beam splitter 445b transmits UV light (light with a wavelength in the range of 10 to 400 nm) and reflects light at 488 nm and 633 nm.

The laser beams are then directed to a focusing lens 420, which focuses the beams onto the portion of a fluid stream where particles of a sample are located, within the flow chamber 425. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 430, the side scatter detector 435, and the one or more fluorescent detectors 460a-460f through one or more of the beam splitters 445a-445g, the bandpass filters 450a-450e, the longpass filters 455a-455b, and the fluorescence collection lens 440.

The fluorescence collection lens 440 collects light emitted from the particle-laser beam interaction and routes that light towards one or more beam splitters and filters. Bandpass filters, such as bandpass filters 450a-450e, allow a narrow range of wavelengths to pass through the filter. For example, bandpass filter 450a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455a-455b, transmit wavelengths of light equal to or longer than a specified wavelength of light. For example, longpass filter 455a, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 445g is a 620 SP beam splitter, meaning that the beam splitter 445g transmits wavelengths of light that are 620 nm or shorter and reflects wavelengths of light that are longer than 620 nm in a different direction. In one embodiment, the beam splitters 445a-445g can comprise optical mirrors, such as dichroic mirrors.

The forward scatter detector 430 is positioned slightly off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 435 is configured to detect refracted and reflected light from the surfaces and internal structures of the particle, and tends to increase with increasing particle complexity of structure. The fluorescence emissions from fluorescent molecules associated with the particle can be detected by the one or more fluorescent detectors 460a-460f. The side scatter detector 435 and fluorescent detectors can include photomultiplier tubes. The signals detected at the forward scatter detector 430, the side scatter detector 435 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 190 is coupled to the detectors to receive the output signals therefrom, and may also be coupled to electrical and electromechanical components of the flow cytometer 400 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data to users of the cytometer 400. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4 includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

Computer-Controlled Systems

Aspects of the present disclosure further include computer-controlled systems, where systems as described above further include one or more computers for complete automation or partial automation. In some embodiments, systems include a computer having a computer readable storage medium with a computer program stored thereon, where the computer program when loaded on the computer includes instructions for irradiating a particle in a flow stream with a first laser, instructions for irradiating the particle in the flow stream with a second laser, instructions for detecting light conveyed from the particle with a single photodetector array having a plurality of photodetectors, instructions for generating multiplexed data signals from the photodetector array and instructions for determining one or more parameters of the particle based on the multiplexed data signals. In some embodiments, the computer program includes instructions for generating time-division multiplexed data signals. In other embodiments, the computer program includes instructions for generating wavelength-division multiplexed data signals.

In some embodiments, systems include a computer having a computer readable storage medium with a computer program stored thereon, where the computer program when loaded on the computer includes instructions for irradiating a flow stream at a first position with a first laser and irradiating the flow stream with one or more lasers at positions different from the first position, such as at positions downstream from the first position. In some instances, the computer program includes instructions for irradiating the flow stream with each of the plurality of lasers at a position that is 5 µm or more downstream from the position of irradiation by the first laser, such as 6 µm or more, such as 7 µm or more, such as 8 µm or more, such as 9 µm or more, such as 10 µm or more, such as 15 µm or more, such as 25 µm or more, such as 50 µm or more, such as 100 µm or more, such as 250 µm or more, such as 500 µm or more and including where the computer program includes instructions for independently irradiating the flow stream with each laser at a position that is 1000 µm or more downstream from the position of irradiation by the first laser. For instance, the computer program may include instructions for irradiating the flow stream at a position downstream from the position of irradiation of the flow stream by the first laser by a distance of from 5 µm to 5000 µm, such as from 10 µm to 2500 µm, such as from 25 µm to 1000 µm, such as from 50 µm to 750 µm, such as from 75 µm to 500 µm and including from 100 µm to 250 µm. In some embodiments, the computer program includes instructions for independently irradiating positions on the flow stream with each laser that are spaced apart from each other by 10 µm or less, such as 9 µm or less, such as 8 µm or less, such as 7 µm or less, such as 6 µm or less and including positions on the flow stream that are spaced apart by 5 µm or less.

In certain instances, the computer program includes instructions for irradiating the flow stream with a first laser at a first position of the flow stream, instructions for irradiating the flow stream with a second laser at a second position of the flow stream that is downstream from the first position, instructions for irradiating the flow stream with a third laser at a third position of the flow stream that is downstream from the second position, instructions for irradiating the flow stream with a fourth laser at a fourth position of the flow stream that is downstream from the third position and instructions for irradiating the flow stream with a fifth laser at a firth position of the flow stream that is downstream from the fourth position.

In some embodiments, the computer program includes instructions for detecting light with each photodetector in the photodetector array at different times. In some instances, light is propagated sequentially across each of the photodetectors in the array and the computer program includes instructions for detecting light by a first photodetector (detector$_{N1}$) at a first time ($t_{N1}$), detecting light with a second photodetector (detector$_{N2}$) at a second time ($t_{N2}$) and detecting light with each of the further photodetectors (detector$_{N+x}$) at times ($t_{N+x}$). In certain instances, the computer program includes instructions for generating time-separated data signals, such as data signals generated by the detection of photons having reduced photon coincidence at a photodetector in the photodetector array.

In some embodiments, systems include a computer having a computer readable storage medium with a computer program stored thereon, where the computer program when loaded on the computer includes instructions for differentially detecting light from the flow stream. In some embodiments, the computer program includes instructions for detecting with the photodetector array, two or more predetermined sets of wavelengths of light as described in detail above, such as 3 or more different sets of wavelengths of light, such as 4 or more, such as 5 or more, such as 6 or more, such as 7 or more, such as 8 or more, such as 9 or more, such as 10 or more, such as 11 or more and including 12 or more different sets of wavelengths of light.

In some embodiments, the computer program includes instructions for detecting light from one or more specific lasers of the light source. In some instances, the computer program includes instructions for assigning each laser to one or more of the photodetectors. For example, the computer program may include instructions for assigning a laser to 90% (e.g., 9 out of 10 photodetectors) or less of the photodetectors in the photodetector array, such as 80% (e.g., 16 out of 20 photodetectors) or less, such as 75% (e.g., 9 out of 12 photodetectors) or less and including 50% (e.g., 8 out of 16 photodetectors) or less of the photodetectors in the photodetector array. In certain embodiments, the computer program includes instructions for assigning a laser to all of the photodetectors in the photodetector array.

In some embodiments, the computer program includes instructions for spectrally resolving the light detected by the photodetectors of the photodetector array, such as by calculating a spectral unmixing matrix for each detected spectra of light. In some embodiments, the computer program includes instructions for determining the overlap of each spectra of light detected from the flow stream and calculating the contribution of each to the overlapping light spectra. In some instances, the computer program includes instructions for estimating the abundance of each contribution to the detected light signal by the photodetectors in the photodetector array. In certain instances, the computer program includes instructions for spectrally resolving light by solving a spectral unmixing matrix using one or more of: 1) a weighted least square algorithm; 2) a Sherman-Morrison iterative inverse updater; 3) an LU matrix decomposition, such as where a matrix is decomposed into a product of a lower-triangular (L) matrix and an upper-triangular (U) matrix; 4) a modified Cholesky decomposition; 5) by QR factorization; and 6) calculating a weighted least squares algorithm by singular value decomposition.

In some embodiments, the computer program includes instructions for determining one or more parameters of an irradiated particle in a flow stream from generated data signals from a photodetector array. In some embodiments, the computer program includes instructions for identifying the particle based on the one or more determined parameters of the particle. In other embodiments, the computer program includes instructions for sorting the particle based on the one or more determined parameters of the particle.

In embodiments, the system includes an input module, a processing module and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, processors include analog electronics which allows the user to manually align a light source with the flow stream based on the first and second light signals. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT®, Windows XP, Windows 7, Windows 8, iOS, Sun Solaris, Linux, OS/400, Compaq Tru64 Unix, SGI IRIX, Siemens Reliant Unix, Ubuntu, Zorin OS and others.

Figure 7:
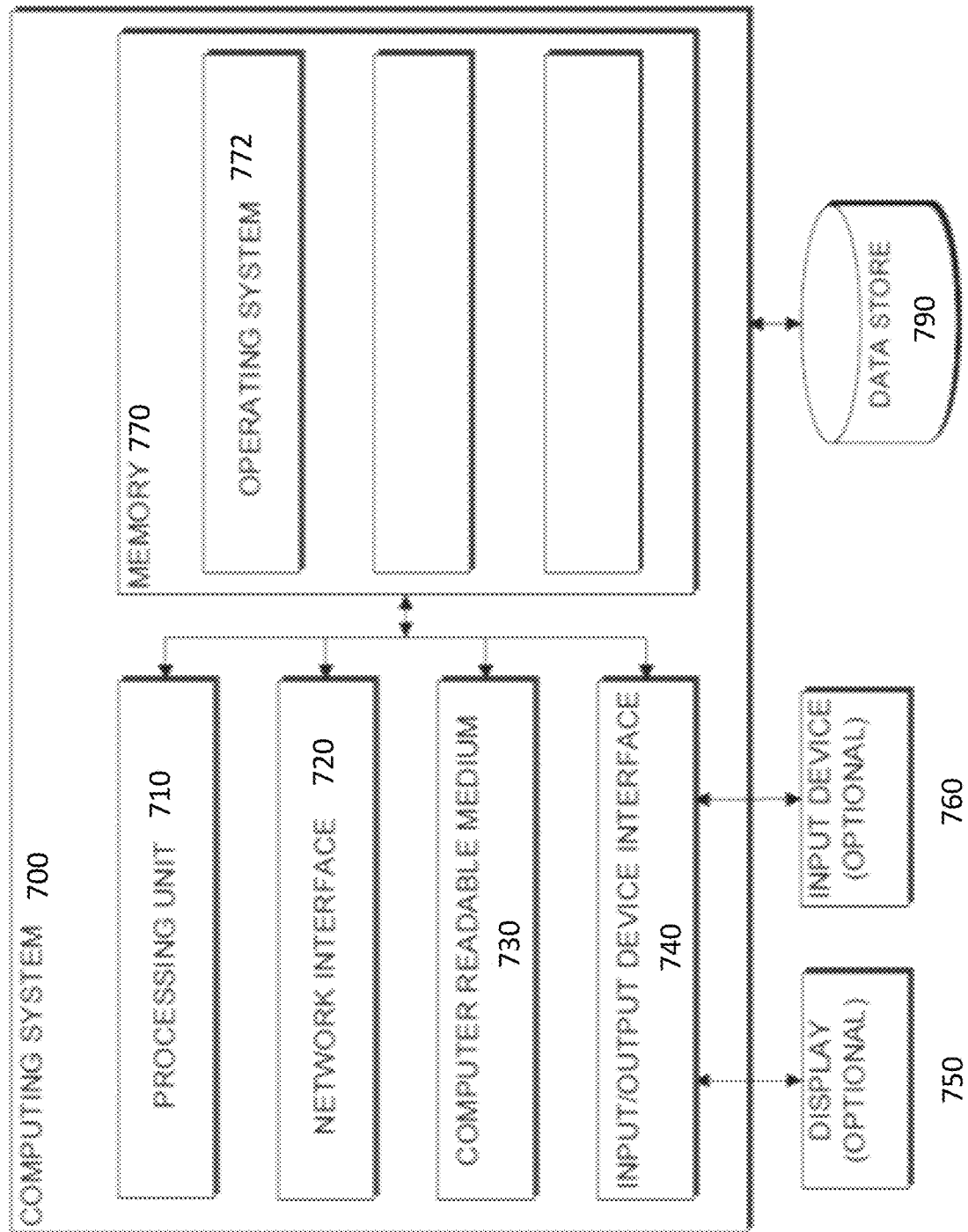
FIG. 7 depicts a block diagram of a computing system according to certain embodiments.

FIG. 7 depicts a general architecture of an example computing device 700 according to certain embodiments. The general architecture of the computing device 700 depicted in FIG. 7 includes an arrangement of computer hardware and software components. The computing device 700 may include many more (or fewer) elements than those shown in FIG. 7. It is not necessary, however, that all of these generally conventional elements be shown in order to provide an enabling disclosure. As illustrated, the computing device 700 includes a processing unit 710, a network interface 720, a computer readable medium drive 730, an input/output device interface 740, a display 750, and an input device 760, all of which may communicate with one another by way of a communication bus. The network interface 720 may provide connectivity to one or more networks or computing systems. The processing unit 710 may thus receive information and instructions from other computing systems or services via a network. The processing unit 710 may also communicate to and from memory 770 and further provide output information for an optional display 750 via the input/output device interface 740. The input/output device interface 740 may also accept input from the optional input device 760, such as a keyboard, mouse, digital pen, microphone, touch screen, gesture recognition system, voice recognition system, gamepad, accelerometer, gyroscope, or other input device.

The memory 770 may contain computer program instructions (grouped as modules or components in some embodiments) that the processing unit 710 executes in order to implement one or more embodiments. The memory 770 generally includes RAM, ROM and/or other persistent, auxiliary or non-transitory computer-readable media. The memory 770 may store an operating system 772 that provides computer program instructions for use by the processing unit 710 in the general administration and operation of the computing device 700. The memory 770 may further include computer program instructions and other information for implementing aspects of the present disclosure.

Methods for Irradiating Particles in a Flow Stream

Aspects of the present disclosure include methods for determining one or more parameters of a particle in a flow stream. Methods according to certain embodiments include irradiating a particle in a flow stream with a first laser, irradiating the particle in the flow stream with a second laser, detecting light from the particle with a single photodetector array having a plurality of photodetectors that is conveyed to the photodetector array through a single light collection component, generating multiplexed data signals from the photodetector array and determining one or more parameters of the particle based on the multiplexed data signals.

In practicing the subject methods, a particle in a flow stream is irradiated with a first laser at a first position in the flow stream and irradiated with one or more lasers at positions in the flow stream different from the first position, such as at positions downstream from the first position. In some embodiments, the particle is irradiated in the flow stream with 2 lasers or more, such as 3 lasers or more, such as 4 lasers or more, such as 5 lasers or more, such as 6 lasers or more, such as 12 lasers or more, such as 16 lasers or more, such as 32 lasers or more and including irradiating the particle in the flow stream with 64 lasers or more. Each laser used to irradiate the flow stream may vary, emitting a wavelength from 200 nm to 1500 nm, such as from 250 nm to 1250 nm, such as from 300 nm to 1000 nm, such as from 350 nm to 900 nm and including from 400 nm to 800 nm.

The types of lasers for irradiating the flow stream may vary and may include a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chloride (XeCl) excimer laser or xenon-fluorine (XeF) excimer laser or a combination thereof. In others instances, the subject light sources include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject lights source includes a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

The flow stream may be irradiated from any suitable distance by each of the flow streams, such as at a distance of 0.001 mm or more from the flow stream, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the flow stream may be irradiated by each of the lasers at any suitable angle (e.g., relative the vertical axis of the flow stream), such as at an angle ranging from 10° to 90°, such as from 15° to 85°, such as from 20° to 80°, such as from 25° to 75° and including from 30° to 60°, for example at a 90° angle.

The flow stream may be irradiated continuously or in discrete intervals. In some instances, the flow stream is irradiated continuously with one or more of the lasers, such as with a continuous wave laser that continuously irradiates the flow stream. In other instances, the flow stream is irradiated in discrete intervals with one or more of the lasers, such as irradiating the flow stream every 0.001 milliseconds, every 0.01 milliseconds, every 0.1 milliseconds, every 1 millisecond, every 10 milliseconds, every 100 milliseconds and including every 1000 milliseconds, or some other interval.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each laser may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each laser is 10 microseconds. In embodiments where sample is sequentially irradiated by more than two (i.e., 3 or more) lasers, the delay between irradiation by each light source may be the same or different.

In embodiments, methods include irradiating the particle in the flow stream at a first position of the flow stream and irradiating the particle with one or more lasers at positions of the flow stream different from the first position, such as at positions downstream from the first position. For instance, in one example, methods include irradiating the flow stream with a first laser at a first position of the flow stream, irradiating the flow stream with a second laser at a second position of the flow stream that is downstream from the first position, irradiating the flow stream with a third laser at a third position of the flow stream that is downstream from the second position, irradiating the flow stream with a fourth laser at a fourth position of the flow stream that is down- stream from the third position and irradiating the flow stream with a fifth laser at a firth position of the flow stream that is downstream from the fourth position.

Depending on the flow rate of the flow stream and the distance between the position of irradiation by each laser, the flow stream may be independently irradiated with each laser at a position that is 5 µm or more downstream from the position of irradiation by the first laser, such as 6 µm or more, such as 7 µm or more, such as 8 µm or more, such as 9 µm or more, such as 10 µm or more, such as 15 µm or more, such as 25 µm or more, such as 50 µm or more, such as 100 µm or more, such as 250 µm or more, such as 500 µm or more and including where irradiating the flow stream with each laser at a position that is 1000 µm or more downstream from the position of irradiation by the first laser. For instance, the flow stream may be irradiated by each laser at a position that is downstream from the position of irradiation of the flow stream by the first laser by a distance of from 5 µm to 5000 µm, such as from 10 µm to 2500 µm, such as from 25 µm to 1000 µm, such as from 50 µm to 750 µm, such as from 75 µm to 500 µm and including from 100 µm to 250 µm. In some embodiments, the flow stream is independently irradiated with each laser at positions that are spaced apart from each other by 10 µm or less, such as 9 µm or less, such as 8 µm or less, such as 7 µm or less, such as 6 µm or less and including positions on the flow stream that are spaced apart by 5 µm or less.

In certain embodiments, methods include irradiating the sample with two or more beams of frequency shifted light. As described above, a light beam generator component may be employed having a laser and an acousto-optic device for frequency shifting the laser light. In these embodiments, methods include irradiating the acousto-optic device with the laser. Depending on the desired wavelengths of light produced in the output laser beam (e.g., for use in irradiating a sample in a flow stream), the laser may have a specific wavelength that varies from 200 nm to 1500 nm, such as from 250 nm to 1250 nm, such as from 300 nm to 1000 nm, such as from 350 nm to 900 nm and including from 400 nm to 800 nm. The acousto-optic device may be irradiated with one or more lasers, such as 2 or more lasers, such as 3 or more lasers, such as 4 or more lasers, such as 5 or more lasers and including 10 or more lasers. The lasers may include any combination of types of lasers. For example, in some embodiments, the methods include irradiating the acousto-optic device with an array of lasers, such as an array having one or more gas lasers, one or more dye lasers and one or more solid-state lasers.

Where more than one laser is employed, the acousto-optic device may be irradiated with the lasers simultaneously or sequentially, or a combination thereof. For example, the acousto-optic device may be simultaneously irradiated with each of the lasers. In other embodiments, the acousto-optic device is sequentially irradiated with each of the lasers. Where more than one laser is employed to irradiate the acousto-optic device sequentially, the time each laser irradiates the acousto-optic device may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the acousto-optic device with the laser for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where the acousto-optic device is sequentially irradiated with two or more lasers, the duration the acousto-optic device is irradiated by each laser may be the same or different.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each laser is 10 microseconds. In embodiments where the acousto-optic device is sequentially irradiated by more than two (i.e., 3 or more) lasers, the delay between irradiation by each laser may be the same or different.

The acousto-optic device may be irradiated continuously or in discrete intervals. In some instances, methods include irradiating the acousto-optic device with the laser continuously. In other instances, the acousto-optic device is irradiated with the laser in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the laser, the acousto-optic device may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In embodiments, methods include applying radiofrequency drive signals to the acousto-optic device to generate angularly deflected laser beams. Two or more radiofrequency drive signals may be applied to the acousto-optic device to generate an output laser beam with the desired number of angularly deflected laser beams, such as 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including 100 or more radiofrequency drive signals.

The angularly deflected laser beams produced by the radiofrequency drive signals each have an intensity based on the amplitude of the applied radiofrequency drive signal. In some embodiments, methods include applying radiofrequency drive signals having amplitudes sufficient to produce angularly deflected laser beams with a desired intensity. In some instances, each applied radiofrequency drive signal independently has an amplitude from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In these embodiments, the angularly deflected laser beams in the output laser beam are spatially separated. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, the angularly deflected laser beams overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, the flow stream is irradiated with a plurality of beams of frequency-shifted light and a cell in the flow stream is imaged by fluorescence imaging using radiofrequency tagged emission (FIRE) to generate a frequency-encoded image, such as those described in Diebold, et al. *Nature Photonics* Vol. 7(10); 806-810 (2013) as well as described in U.S. Pat. Nos. 9,423,353; 9,784,661 and 10,006,852 and U.S. Patent Publication Nos. 2017/0133857 and 2017/0350803, the disclosures of which are herein incorporated by reference.

In some embodiments, the flow stream is irradiated with the one or more lasers through an optical adjustment component. In some instances, the optical adjustment component is configured to change the spatial width of irradiation or some other characteristic of irradiation from one or more of the lasers, such as for example, irradiation direction, wavelength, beam profile, beam width, beam intensity, focal point and pulse width. In some embodiments, methods include adjusting with an optical adjustment one or more of irradiation direction, wavelength, beam profile, beam width, beam intensity, focal point and pulse width of the laser.

In embodiments, light from the flow stream is conveyed to the photodetector array through a light collection component. In some embodiments, light from the flow stream is conveyed directed to the light receiving end of the light collection component. In other embodiments, light from the flow stream is passed through an optical adjustment component to the light receiving end of the light collection component. In some instances, the optical adjustment component adjusts the focal point of light from the flow stream from each of the lasers. In other instances, the optical adjustment component adjusts the size of each beam spot from each of the lasers on the light collection component (e.g., single fiber optic). For instance, the optical adjustment component may be configured to decrease the size of each beam spot on the light collection component by 0.001 µm or more, such as by 0.005 µm or more, such as by 0.01 µm or more, such as by 0.05 µm or more, such as by 0.1 µm or more, such as by 0.2 µm, such as by 0.3 µm or more, such as by 0.4 µm or more, such as by 0.5 µm or more, such as by 0.6 µm or more, such as by 0.7 µm or more, such as by 0.8 µm or more, such as by 0.9 µm or more and including by 1.0 µm or more. In some embodiments, the optical adjustment component is configured to decrease the size of each beam spot on the light collection component by 10% or more, such as by 25% or more, such as by 50% or more, such as by 75% or more, such as by 90% or more and including by 95% or more. In certain instances, the optical adjustment component is configured to decrease the size of each beam spot on the light collection component by 1.5-fold or more, such as by 2-fold or more, such as by 3-fold or more, such as by 4-fold or more, such as by 5-fold or more and including by 10-fold or more.

In still other instances, methods include adjust with an optical adjustment component the space between each beam spot from each of the lasers on the light collection component, such as decreasing with the optical adjustment component the space between each beam spot by 0.01 µm or more, such as by 0.05 µm or more, such as by 0.1 µm or more, such as by 0.5 µm or more, such as by 1 µm or more, such as by 2 µm, such as by 3 µm or more, such as by 4 µm or more, such as by 5 µm or more, such as by 6 µm or more, such as by 7 µm or more, such as by 8 µm or more, such as by 9 µm or more and including by 10 µm or more. For instance, the space between each beam spot may be decreased with the optical adjustment component by 5% or more, such as by 10% or more, such as by 25% or more, such as by 50% or more, such as by 75% or more, such as by 90% or more and including by 95% or more. In certain instances, the space between each beam spot is decreased with the optical adjustment component by 1.5-fold or more, such as by 2-fold or more, such as by 3-fold or more, such as by 4-fold or more, such as by 5-fold or more and including by 10-fold or more.

In embodiments, light from the flow stream is collected with a light collection component and conveyed to the photodetector array. In certain embodiments, methods include conveying light from the flow stream to the photodetector array with a single fiber optic. The single fiber optic, according to some instances, has a light receiving end having a diameter of from 5 µm to 1000 µm, such as from 10 µm to 900 µm, such as from 20 µm to 800 µm, such as from 30 µm to 700 µm, such as from 40 µm to 600 µm, such as from 50 µm to 500 µm, such as from 60 µm to 400 µm, such as from 70 µm to 300 µm, such as from 80 µm to 200 µm and including from 100 µm to 200 µm. The light propagating end of the single fiber optic may have a diameter of from 5 µm to 1000 µm, such as from 10 µm to 900 µm, such as from 20 µm to 800 µm, such as from 30 µm to 700 µm, such as from 40 µm to 600 µm, such as from 50 µm to 500 µm, such as from 60 µm to 400 µm, such as from 70 µm to 300 µm, such as from 80 µm to 200 µm and including from 100 µm to 200 µm.

In some embodiments, the positions of irradiation spanned by the lasers on the flow stream is equal to or less than the diameter of the single fiber optic configured to collect light from the flow stream. For example, lasers in the subject systems may be configured to irradiate positions on the flow stream that span 100 µm or less, such as 90 µm or less, such as 80 µm or less, such as 70 µm or less, such as 60 µm or less and including 50 µm or less and the single fiber optic may have a diameter which is sufficient to collect light from each of the positions irradiated by the lasers, such as a diameter of 50 µm or more, such as 60 µm or more, such as 70 µm or more, such as 80 µm or more, such as 90 µm or more and including where the single fiber optic configured to collect light from the irradiated flow stream is 100 µm or more.

Light conveyed from the light collection component is detected with a photodetector array having a plurality of photodetectors. In certain embodiments, light is detected with a photodetector array that includes 4 or more photodetectors, such as 5 photodetectors or more, such as 10 photodetectors or more, such as 25 photodetectors or more and including 50 photodetectors or more. Photodetectors may include but not limited to photosensors or photodetectors, such as active-pixel sensors (APSs), quadrant photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, light is detected with one or more hybrid photodetectors that includes a photocathode integrated with an avalanche diode. In some instances, the photocathode of the hybrid photodetector is a GaAs/GaAsP photocathode.

The photodetectors may be arranged in the photodetector array in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular patterned configurations. The photodiodes in the photodiode array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°. The photodiode array may be any suitable shape and may be a rectilinear shape, e.g., squares, rectangles, trapezoids, triangles, hexagons, etc., curvilinear shapes, e.g., circles, ovals, as well as irregular shapes, e.g., a parabolic bottom portion coupled to a planar top portion. In certain embodiments, the photodiode array has a rectangular-shaped active surface.

Each photodetector in the array may have an active surface with a width that ranges from 5 µm to 250 µm, such as from 10 µm to 225 µm, such as from 15 µm to 200 µm, such as from 20 µm to 175 µm, such as from 25 µm to 150 µm, such as from 30 µm to 125 µm and including from 50 µm to 100 µm and a length that ranges from 5 µm to 250 µm, such as from 10 µm to 225 µm, such as from 15 µm to 200 µm, such as from 20 µm to 175 µm, such as from 25 µm to 150 µm, such as from 30 µm to 125 µm and including from 50 µm to 100 µm, where the surface area of each photodiode in the array ranges from 25 to µm² to 10000 µm², such as from 50 to µm² to 9000 µm², such as from 75 to µm² to 8000 µm², such as from 100 to µm² to 7000 µm², such as from 150 to µm² to 6000 µm² and including from 200 to µm² to 5000 µm².

The size of the photodetector array may vary depending on the amount and intensity of the light, the number of photodiodes and the desired sensitivity and may have a length that ranges from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. The width of the photodiode array may also vary, ranging from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. As such, the active surface of the photodiode array may range from 0.1 mm² to 10000 mm², such as from 0.5 mm² to 5000 mm², such as from 1 mm² to 1000 mm², such as from 5 mm² to 500 mm², and including from 10 mm² to 100 mm².

Collected light is measured at one or more wavelengths, such as at 2 or more wavelengths, such as at 5 or more different wavelengths, such as at 10 or more different wavelengths of light, such as 15 or more, such as 25 or more, such as 50 or more, such as 100 or more, such as 200 or more, such as 300 or, such as 400 or more, such as 500 or more, such as 1000 or more, such as 1500 or more, such as 2500 or more and including 5000 or more different wavelengths of light. In certain embodiments, methods include measuring a spectrum of light with the photodetectors, such as where the spectrum of light includes wavelengths which span 50 nm or more, such as 100 nm or more, such as 200 nm or more, such as 300 nm or more, such as 400 nm or more, such as 500 or more, such as 600 or more, such as 700 nm or more, such as 800 nm or more, such as 900 nm or more, such as 1000 nm or more and including 1500 nm or more. For instance, methods may include measuring light in a range from 200 nm to 1500 nm, such as from 400 nm to 1100 nm.

The light may be measured continuously or in discrete intervals. In some instances, light measurements are taken continuously. In other instances light measurements are taken in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In some embodiments, light is detected with each of the photodetectors in the photodetector array at different times. In some instances, light is propagated sequentially across each of the photodetectors in the array, such as where light is detected by a first photodetector (detector$_{N1}$) at a first time ($t_{N1}$), propagated to a second photodetector (detector$_{N2}$) and detected at a second time ($t_{N2}$), followed by light propagation to each of the further photodetectors (detector$_{N+X}$) and detected at times ($t_{N+X}$). In these embodiments, methods include light detection that is time separated. In some embodiments, detection of light by each of the photodetectors in the photodetector array is time-separated by 0.01 ps or more, such as by 0.05 ps or more, such as by 0.1 ps or more, such as by 0.5 ps or more, such as by 1.0 ps or more, such as by 2 ps or more, such as by 3 ps or more, such as by 4 ps or more, such as by 5 ps or more, such as by 10 ps or more, such as by 25 ps or more, such as by 50 ps or more, such as by 75 ps or more, such as by 100 ps or more and including by 500 ps or more. In some embodiments, methods include generating time-separated data signals from each of the photodetectors.

In some embodiments, methods include differentially detecting light from the flow stream with each photodetector in the photodetector array. In some embodiments, two or more predetermined sets of wavelengths of light are detected with the photodetector array, such as where the photodetector array detects 3 or more different sets of wavelengths of light, such as 4 or more, such as 5 or more, such as 6 or more, such as 7 or more, such as 8 or more, such as 9 or more, such as 10 or more, such as 11 or more and including 12 or more different sets of wavelengths of light. Each predetermined set of wavelengths of light may include 5 or more different wavelengths of light, such as 10 or more, such as 15 or more, such as 25 or more, such as 50 or more, such as 100 or more, such as 200 or more, such as 300 or, such as 400 or more, such as 500 or more, such as 1000 or more, such as 1500 or more, such as 2500 or more and including 5000 or more different wavelengths of light.

In certain embodiments, methods include detecting a predetermined spectral range of light, $X_s$ (in nanometers, nm) with each photodetector. The predetermined spectral ranges may vary, where in certain embodiments, spectral ranges ($X_s$) of light span from 50 nm to 300 nm, such as from 75 nm to 275 nm, such as from 100 nm to 250 nm, such as from 125 nm to 225 nm and including from 150 nm to 200 nm. In certain embodiments, the spectral range of light detected by each photodetector spans 100 nm (i.e., $X_s$=100 nm).

In certain embodiments, methods include detecting light from one or more specific lasers of the light source with the photodetectors in the photodetector array. In some instances, methods include assigning each laser to one or more of the photodetectors such that light from the laser (e.g., as scattered light from the flow stream or fluourescence from a fluorophore irradiated by the laser in the flow stream) is detected by the one or more assigned photodetectors in the photodetector array. Depending on the number of lasers in the light source (as described above) and the number of photodetectors in the photodetector array, light from each laser may be assigned to two or more photodetectors, such as 3 or more photodetectors, such as 4 or more, photodetectors, such as 5 or more photodetectors, such as 6 or more photodetectors, such as 8 or more photodetectors, such as 10 or more photodetectors and including 12 or more photodetectors. In certain embodiments, light from a laser in the light source may be detected by all of the photodetectors of the photodetector array. In other embodiments, light from a laser in the light source may be detected by 90% (e.g., 9 out of 10 photodetectors) or less of the photodetectors in the photodetector array, such as 80% (e.g., 16 out of 20 photodetectors) or less, such as 75% (e.g., 9 out of 12 photodetectors) or less and including 50% (e.g., 8 out of 16 photodetectors) or less of the photodetectors in the photodetector array. In some embodiments, methods include assigning each photodetector in the photodetector array to detect one or more predetermined sets of wavelengths of light, such as light from one or more the lasers in the light source.

In some embodiments, methods include determining one or more parameters of a particle in a flow stream. In embodiments, each photodetector in the photodetector array is configured to generate one or more data signals in response to detected light. In some instances, data signals generated by the photodetector array are multiplexed data signals. In certain embodiments, methods include time-division multiplexing where time discrimination is used to separate distinct photons conveyed by the single light collection component to the photodetector array (e.g., single fiber optic). As described above, each photodetector may be configured to detect light from the flow stream at different times and the outputted data signals from the plurality of photodetectors may be multiplexed. In these embodiments, a time-division multiplexed data signal may be outputted to a processor. For example, the time-division multiplexed data signal may include generated data signals from light detected at 2 or more different times, such as at 4 or more different times, such as at 8 or more different times, such as at 16 or more different times, such as at 6 or more different times, such as at 32 or more different times, such as at 64 or more different times, such as at 128 or more different times and including at 256 or more different times.

In other embodiments, methods include wavelength-division multiplexing where different wavelengths of light from the flow stream are conveyed through the single light collection component and detected by the plurality of photodetectors of the photodetector array. In these embodiments, each photodetector may be configured to detect one or more predetermined sets of wavelengths of light. In these embodiments, data signals generated by the predetermined set of wavelengths of light from the plurality of photodetectors are multiplexed and a wavelength-division multiplexed data signal is outputted to a processor. For example, the wavelength-division multiplexed data signal may include generated data signals from 2 or more different predetermined sets of wavelengths of light, such as 3 or more, such as 4 or more, such as 5 or more, such as 6 or more, such as 7 or more, such as 8 or more, such as 9 or more, such as 10 or more, such as 11 or more and including a wavelength-division multiplexed data signal that includes generated data signals from 12 or more predetermined sets of wavelengths of light. In certain embodiments, methods include generating a wavelength-division multiplexed data signal that includes data signals from 2 or more different spectra of light detected by the photodetectors, such as 3 or more, such as 4 or more, such as 5 or more, such as 6 or more, such as 7 or more, such as 8 or more, such as 9 or more, such as 10 or more, such as 11 or more and including generating a wavelength-division multiplexed data signal that includes data signals from 12 or more different spectra of light detected by the photodetectors.

In some embodiments, methods include spectrally resolve light detected by the photodetectors of the photodetector array. In certain embodiments, the overlapping spectral component of the light is determined by calculating a spectral unmixing matrix. In some embodiments, a spectrum of light detected by each photodetector overlaps with the spectrum of light detected by at least one other detector in the photodetector array. In some instances, the spectrum of light detected by a photodetector in the photodetector array overlaps with the spectrum of light of at least one other detector by 5 nm or more, such as by 10 nm or more, such as by 25 nm or more and including by 50 nm or more. In certain instances, the spectrum of light detected by a photodetector overlaps with the spectra of two or more other photodetectors in the photodetector array, such as where each overlap is by 5 nm or more, such as by 10 nm or more, such as by 25 nm or more and including by 50 nm or more. In other embodiments, the spectra of light detected by a photodetectors in the photodetector array have non-overlapping spectra. In these embodiments, the spectrum of light detected by each photodetector is adjacent to the spectrum of at least one other photodetector within 10 nm or less, such as 9 nm or less, such as 8 nm or less, such as 7 nm or less, such as 6 nm or less, such as 5 nm or less, such as 4 nm or less, such as 3 nm or less, such as 2 nm or less and including 1 nm or less.

In some embodiments, methods include determining the overlap of the spectra of light from the flow stream and calculating the contribution of each to the overlapping detected light spectra. In some embodiments, spectrally resolving light includes calculating a spectral unmixing matrix. In certain embodiments, methods include calculating a spectral unmixing matrix to estimate the abundance of each contribution to the detected light signal by the photodetectors in the photodetector array.

In some instances, calculating the spectral unmixing matrix includes determining the abundance of a fluorophore associated with a target particle in the flow stream. The abundance of each fluorophore associated with a target particle may be used in identifying and classifying a particle. In some instances, identified or classified particles may be used to sort target particles (e.g., cells) in the sample. In certain embodiments, calculating spectral unmixing, is conducted so that sorting is sufficiently fast to sort particles in real time after detection by the light detection system.

In certain embodiments, methods include spectrally resolving light detected by the plurality of photodetectors in the photodetector array such as described e.g., in International Patent Application No. PCT/US2019/068395 filed on Dec. 23, 2019, the disclosure of which is herein incorporated by reference in its entirety. For example, spectrally resolving light detected by the plurality of photodetectors in the photodetector array may be include solving a spectral unmixing matrix using one or more of: 1) a weighted least square algorithm; 2) a Sherman-Morrison iterative inverse updater; 3) an LU matrix decomposition, such as where a matrix is decomposed into a product of a lower-triangular (L) matrix and an upper-triangular (U) matrix; 4) a modified Cholesky decomposition; 5) by QR factorization; and 6) calculating a weighted least squares algorithm by singular value decomposition.

In certain embodiments, methods include sorting one or more of the particles (e.g., cells) of a sample in the flow stream. For example, methods may include sorting 2 or more components of the sample, such as 3 or more components, such as 4 or more components, such as 5 or more components, such as 10 or more components, such as 15 or more components and including sorting 25 or more components of the sample. In certain embodiments, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

In sorting particles, methods include data acquisition, analysis and recording, such as with a computer, where multiple data channels record data from each detector used. In these embodiments, analysis may include spectrally resolving light (e.g., by calculating the spectral unmixing matrix) as described above. This analysis may be conveyed to a sorting system which is configured to generate a set of digitized parameters based on the particle classification.

In some embodiments, methods for sorting components of sample include sorting particles (e.g., cells in a biological sample) with a particle sorting module having deflector plates, such as described in U.S. Patent Publication No. 2017/0299493, filed on Mar. 28, 2017, the disclosure of which is incorporated herein by reference. In certain embodiments, cells of the sample are sorted using a sort decision module having a plurality of sort decision units, such as those described in U.S. patent application Ser. No. 16/725,756, filed on Dec. 23, 2019, the disclosure of which is incorporated herein by reference.

Non-Transitory Computer-Readable Storage Medium for Irradiating Particles in a Flow Stream Aspects of the present disclosure further include non-transitory computer readable storage mediums having instructions for practicing the subject methods. Computer readable storage mediums may be employed on one or more computers for complete automation or partial automation of a system for practicing methods described herein. In certain embodiments, instructions in accordance with the method described herein can be coded onto a computer-readable medium in the form of "programming", where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-R, magnetic tape, non-volatile memory card, ROM, DVD-ROM, Blue-ray disk, solid state disk, and network attached storage (NAS), whether or not such devices are internal or external to the computer. A file containing information can be "stored" on computer readable medium, where "storing" means recording information such that it is accessible and retrievable at a later date by a computer. The computer-implemented method described herein can be executed using programming that can be written in one or more of any number of computer programming languages. Such languages include, for example, Java (Sun Microsystems, Inc., Santa Clara, CA), Visual Basic (Microsoft Corp., Redmond, WA), and C++ (AT&T Corp., Bedminster, NJ), as well as any many others.

In some embodiments, computer readable storage media of interest include a computer program stored thereon, where the computer program when loaded on the computer includes instructions having algorithm for irradiating a particle in a flow stream with a first laser, algorithm for irradiating the particle in the flow stream with a second laser, algorithm for detecting light conveyed from the particle with a single photodetector array having a plurality of photodetectors, algorithm for generating multiplexed data signals from the photodetector array and algorithm for determining one or more parameters of the particle based on the multiplexed data signals. In some embodiments, the non-transitory computer readable storage medium includes algorithm for generating time-division multiplexed data signals. In other embodiments, the non-transitory computer readable storage medium includes algorithm for generating wavelength-division multiplexed data signals.

In some embodiments, the non-transitory computer readable storage medium includes algorithm for irradiating a flow stream at a first position with a first laser and irradiating the flow stream with one or more lasers at positions different from the first position, such as at positions downstream from the first position. In some instances, the non-transitory computer readable storage medium includes algorithm for irradiating the flow stream with each of the plurality of lasers at a position that is 5 µm or more downstream from the position of irradiation by the first laser, such as 6 µm or more, such as 7 µm or more, such as 8 µm or more, such as 9 µm or more, such as 10 µm or more, such as 15 µm or more, such as 25 µm or more, such as 50 µm or more, such as 100 µm or more, such as 250 µm or more, such as 500 µm or more and including where the non-transitory computer readable storage medium includes algorithm for independently irradiating the flow stream with each laser at a position that is 1000 µm or more downstream from the position of irradiation by the first laser. For instance, the non-transitory computer readable storage medium includes algorithm for irradiating the flow stream at a position downstream from the position of irradiation of the flow stream by the first laser by a distance of from 5 µm to 5000 µm, such as from 10 µm to 2500 µm, such as from 25 µm to 1000 µm, such as from 50 µm to 750 µm, such as from 75 µm to 500 µm and including from 100 µm to 250 µm. In some embodiments, the non-transitory computer readable storage medium includes algorithm for independently irradiating positions on the flow stream with each laser that are spaced apart from each other by 10 µm or less, such as 9 µm or less, such as 8 µm or less, such as 7 µm or less, such as 6 µm or less and including positions on the flow stream that are spaced apart by 5 µm or less.

In certain instances, the non-transitory computer readable storage medium includes algorithm for irradiating the flow stream with a first laser at a first position of the flow stream, algorithm for irradiating the flow stream with a second laser at a second position of the flow stream that is downstream from the first position, algorithm for irradiating the flow stream with a third laser at a third position of the flow stream that is downstream from the second position, algorithm for irradiating the flow stream with a fourth laser at a fourth position of the flow stream that is downstream from the third position and algorithm for irradiating the flow stream with a fifth laser at a firth position of the flow stream that is downstream from the fourth position.

In some embodiments, the non-transitory computer readable storage medium includes algorithm for detecting light with each photodetector in the photodetector array at different times. In some instances, the non-transitory computer readable storage medium includes algorithm for detecting light by a first photodetector (detector$_{N1}$) at a first time ($t_{N1}$), detecting light with a second photodetector (detector$_{N2}$) at a second time ($t_{N2}$) and detecting light with each of the further photodetectors (detector$_{N+X}$) at times ($t_{N+X}$). In certain instances, the non-transitory computer readable storage medium includes algorithm for generating time-separated data signals, such as data signals generated by the detection of photons having reduced photon coincidence at a photodetector in the photodetector array.

In some embodiments, the non-transitory computer readable storage medium includes algorithm for differentially detecting light from the flow stream. In some embodiments, the non-transitory computer readable storage medium includes algorithm for detecting with the photodetector array, two or more predetermined sets of wavelengths of light as described in detail above, such as 3 or more different sets of wavelengths of light, such as 4 or more, such as 5 or more, such as 6 or more, such as 7 or more, such as 8 or more, such as 9 or more, such as 10 or more, such as 11 or more and including 12 or more different sets of wavelengths of light.

In some embodiments, the non-transitory computer readable storage medium includes algorithm for detecting light from one or more specific lasers of the light source. In some instances, the non-transitory computer readable storage medium includes algorithm for assigning each laser to one or more of the photodetectors. The non-transitory computer readable storage medium may include algorithm for assigning a laser to 90% (e.g., 9 out of 10 photodetectors) or less of the photodetectors in the photodetector array, such as 80% (e.g., 16 out of 20 photodetectors) or less, such as 75% (e.g., 9 out of 12 photodetectors) or less and including 50% (e.g., 8 out of 16 photodetectors) or less of the photodetectors in the photodetector array. In certain embodiments, the non-transitory computer readable storage medium includes algorithm for assigning a laser to all of the photodetectors in the photodetector array.

In some embodiments, the non-transitory computer readable storage medium includes algorithm for spectrally resolving the light detected by the photodetectors of the photodetector array, such as by calculating a spectral unmixing matrix for each detected spectra of light. In some embodiments, the non-transitory computer readable storage medium includes algorithm for determining the overlap of each spectra of light detected from the flow stream and calculating the contribution of each to the overlapping light spectra. In some instances, the non-transitory computer readable storage medium includes algorithm for estimating the abundance of each contribution to the detected light signal by the photodetectors in the photodetector array. In certain instances, the non-transitory computer readable storage medium includes algorithm for spectrally resolving light by solving a spectral unmixing matrix using one or more of: 1) a weighted least square algorithm; 2) a Sherman-Morrison iterative inverse updater; 3) an LU matrix decomposition, such as where a matrix is decomposed into a product of a lower-triangular (L) matrix and an upper-triangular (U) matrix; 4) a modified Cholesky decomposition; 5) by QR factorization; and 6) calculating a weighted least squares algorithm by singular value decomposition.

In some embodiments, the non-transitory computer readable storage medium includes algorithm for determining one or more parameters of an irradiated particle in a flow stream from generated data signals from a photodetector array. In some embodiments, the non-transitory computer readable storage medium includes algorithm for identifying the particle based on the one or more determined parameters of the particle. In other embodiments, the non-transitory computer readable storage medium includes algorithm for sorting the particle based on the one or more determined parameters of the particle.

The non-transitory computer readable storage medium may be employed on one or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

Kits

Aspects of the invention further include kits, where kits include one or more lasers, a light collection component and a photodetector array having a plurality of photodetectors as described herein. In some embodiments, the kits include a fiber optic. In certain embodiments, kits include one or more hybrid photodetectors that include a photocathode integrated with an avalanche diode. In certain embodiments, kits include one or more hybrid photodetectors having a GaAs/GaAsP photocathode. Kits may also include an optical adjustment component that is configured to restrict the passage of one or more wavelengths of light. In some instances, the optical adjustment component is a bandpass filter, such as a long pass filter. In other instances, the optical adjustment component is a dichroic mirror.

The various assay components of the kits may be present in separate containers, or some or all of them may be pre-combined. For example, in some instances, one or more components of the kit, e.g., each fiber optic, photodetector or laser is present in a sealed pouch, e.g., a sterile foil pouch or envelope.

In addition to the above components, the subject kits may further include (in certain embodiments) instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject systems, methods, and computer systems find use in a variety of applications where it is desirable to analyze and sort particle components in a sample in a fluid medium, such as a biological sample. The present disclosure also finds use in flow cytometry where it is desirable to provide a flow cytometer with improved cell sorting accuracy, enhanced particle collection, reduced energy consumption, particle charging efficiency, more accurate particle charging and enhanced particle deflection during cell sorting. In embodiments, the present disclosure reduces the need for user input or manual adjustment during sample analysis with a flow cytometer. In certain embodiments, the subject systems provide fully automated protocols so that adjustments to a flow cytometer during use require little, if any human input.

The present disclosure also finds use in applications where cells prepared from a biological sample may be desired for research, laboratory testing or for use in therapy. In some embodiments, the subject methods and devices may facilitate the obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A particle analyzer comprising:
    a light source comprising:
        a first laser configured to irradiate a particle in a flow stream at a first position; and
        a second laser configured to irradiate the particle in the flow stream at a second position different from the first position; and
    a light detection system positioned in a housing of the particle analyzer, the light detection system comprising:
        a single light collection component configured to collect light from the flow stream; and
        a single photodetector array comprising a plurality of photodetectors configured to detect light from the particle conveyed through the single light collection component, wherein the photodetector array comprises:
    a first photodetector configured to detect light from the particle at the first position at a first time and at the second position at a second time; and
    a second photodetector configured to detect light from the particle at the first position at a time that is different from the first time and at the second position at a time that is different from the second time; and
    a processor comprising memory operably coupled to the processor wherein the memory comprises instructions stored thereon which when executed by the processor, cause the processor to:
        generate time-division multiplexed and wavelength-division multiplexed data signals from the light detected by the first photodetector from the particle at the first position and the second position and from the light detected by the second photodetector from the particle at the first position and at the second position;
        determine one or more parameters of the particles based on the multiplexed data signals.

2. The particle analyzer according to claim 1, wherein the second laser is configured to irradiate the particle in the flow stream at a position downstream from the first laser.

3. The particle analyzer according to claim 2, wherein the first laser and the second laser are configured to irradiate the particle in the flow stream at positions that are spaced apart from each other by 10 µm or less.

4. The particle analyzer according to claim 1, wherein the light collection component is a single fiber optic.

5. The particle analyzer according to claim 1, wherein each photodetector in the photodetector array is configured to differentially detect light from one or more of the lasers.

6. The particle analyzer according to claim 1, wherein each photodetector in the photodetector array is configured to detect one or more predetermined sets of wavelengths of light.

7. The particle analyzer according to claim 6, wherein each photodetector in the photodetector array is configured to detect a spectral range of light that spans 300 nm or less.

8. The particle analyzer according to claim 7, wherein each photodetector in the photodetector array is configured to detect a spectral range of light that spans 100 nm.

9. The particle analyzer according to claim 1, wherein each photodetector in the photodetector array is a hybrid photodetector comprising a photocathode integrated with an avalanche diode.

\* \* \* \* \*